(12) United States Patent
Elbsat et al.

(10) Patent No.: US 12,099,947 B2
(45) Date of Patent: *Sep. 24, 2024

(54) BUILDING ENERGY SYSTEM WITH LOAD-FOLLOWING-BLOCK RESOURCE ALLOCATION

(71) Applicant: Tyco Fire & Security GmbH, Neuhausen am Rheinfall (CH)

(72) Inventors: Mohammad N. Elbsat, Milwaukee, WI (US); Michael J. Wenzel, Grafton, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,188

(22) Filed: May 11, 2023

(65) Prior Publication Data
US 2023/0281534 A1    Sep. 7, 2023

Related U.S. Application Data

(63) Continuation of application No. 17/395,672, filed on Aug. 6, 2021, now Pat. No. 11,663,541, which is a
(Continued)

(51) Int. Cl.
*G06Q 10/06* (2023.01)
*G06Q 10/04* (2023.01)
(Continued)

(52) U.S. Cl.
CPC ....... *G06Q 10/06315* (2013.01); *G06Q 10/04* (2013.01); *G06Q 10/06313* (2013.01); *G06Q 50/06* (2013.01)

(58) Field of Classification Search
CPC ............. G06Q 10/06315; G06Q 10/04; G06Q 10/06313; G06Q 50/06
(Continued)

(56) References Cited

U.S. PATENT DOCUMENTS 7,580,775 B2    8/2009  Kulyk et al.
7,894,946 B2    2/2011  Kulyk et al.
(Continued)

FOREIGN PATENT DOCUMENTS

| CA | 2957726 A1 | 3/2016 |
|---|---|---|
| CA | 3043996 A1 | 2/2018 |
| EP | 1 156 286 A2 | 11/2001 |
| EP | 3 186 687 A4 | 7/2017 |
| EP | 3 497 377 A1 | 6/2019 |
| WO | WO-2012/161804 A1 | 11/2012 |

(Continued)

OTHER PUBLICATIONS

EP Office Action on EP Appl. Ser. No. 19 217 287.2 dated Feb. 5, 2024 (1 page).

(Continued)

*Primary Examiner* — Michael J Brown
(74) *Attorney, Agent, or Firm* — Foley & Lardner LLP

(57) ABSTRACT

A controller for equipment that operate to store, discharge, generate, or consume one or more resources is configured to provide an objective function indicating a total value of obtaining a resource from a utility provider over a plurality of time steps subject to a load-following-block rate structure. The objective function includes a first term representing a load-following-block of the resource as being sourced from the utility provider at a fixed rate and a second term representing a remainder of the resource as being sourced from the utility provider at a variable rate. The controller is configured to use the objective function to generate values for decision variables and control the equipment to store, discharge, generate, or consume amounts of the resources indicated by the values of the decision variables at the plurality of time steps.

20 Claims, 13 Drawing Sheets

Related U.S. Application Data continuation of application No. 16/223,746, filed on Dec. 18, 2018, now Pat. No. 11,164,126.

(51) Int. Cl.
  *G06Q 10/0631* (2023.01)
  *G06Q 50/06* (2024.01)

(58) Field of Classification Search
  USPC .......................................................... 705/7
  See application file for complete search history.

(56) References Cited

U.S. PATENT DOCUMENTS

| | | | |
|---|---|---|---|
| 8,527,108 | B2 | 9/2013 | Kulyk et al. |
| 8,527,109 | B2 | 9/2013 | Kulyk et al. |
| 8,918,223 | B2 | 12/2014 | Kulyk et al. |
| 9,110,647 | B2 | 8/2015 | Kulyk et al. |
| 9,429,923 | B2 | 8/2016 | Ward et al. |
| 9,447,985 | B2 | 9/2016 | Johnson |
| 9,703,339 | B2 | 7/2017 | Kulyk et al. |
| 10,139,877 | B2 | 11/2018 | Kulyk et al. |
| 10,592,833 | B2 | 3/2020 | Fife |
| 10,678,279 | B2 | 6/2020 | Corbin |
| 10,871,756 | B2 | 12/2020 | Johnson et al. |
| 10,908,578 | B2 | 2/2021 | Johnson et al. |
| 10,921,768 | B2 | 2/2021 | Johnson et al. |
| 11,156,978 | B2 | 10/2021 | Johnson et al. |
| 11,164,126 | B2 | 11/2021 | Elbsat et al. |
| 11,663,541 | B2 * | 5/2023 | Elbsat .............. G06Q 10/06315 700/291 |
| 2003/0055798 | A1 | 3/2003 | Hittle et al. |
| 2006/0155423 | A1 | 7/2006 | Budike |
| 2007/0130093 | A1 | 6/2007 | Haji-Valizadeh |
| 2007/0179855 | A1 | 8/2007 | Rueda et al. |
| 2012/0053741 | A1 | 3/2012 | Beyerle et al. |
| 2014/0049545 | A1 | 2/2014 | Losee et al. |
| 2015/0316902 | A1 | 11/2015 | Wenzel et al. |
| 2015/0316907 | A1 | 11/2015 | Elbsat et al. |
| 2016/0377306 | A1 | 12/2016 | Drees et al. |
| 2016/0379319 | A1 | 12/2016 | Drees et al. |
| 2017/0062897 | A1 | 3/2017 | Chance |
| 2017/0102162 | A1 | 4/2017 | Drees et al. |
| 2017/0102433 | A1 | 4/2017 | Wenzel et al. |
| 2017/0102434 | A1 | 4/2017 | Wenzel et al. |
| 2017/0102675 | A1 | 4/2017 | Drees |
| 2017/0103483 | A1 | 4/2017 | Drees et al. |
| 2017/0104332 | A1 | 4/2017 | Wenzel et al. |
| 2017/0104336 | A1 | 4/2017 | Elbsat et al. |
| 2017/0104337 | A1 | 4/2017 | Drees |
| 2017/0104342 | A1 | 4/2017 | Elbsat et al. |
| 2017/0104343 | A1 | 4/2017 | Elbsat et al. |
| 2017/0104344 | A1 | 4/2017 | Wenzel et al. |
| 2017/0104345 | A1 | 4/2017 | Wenzel et al. |
| 2017/0104346 | A1 | 4/2017 | Wenzel et al. |
| 2017/0104449 | A1 | 4/2017 | Drees |
| 2018/0197253 | A1 | 7/2018 | Elbsat et al. |
| 2018/0224814 | A1 | 8/2018 | Elbsat et al. |
| 2018/0285800 | A1 | 10/2018 | Wenzel et al. |
| 2019/0036340 | A1 | 1/2019 | Meeker et al. |
| 2019/0079473 | A1 | 3/2019 | Kumar et al. |

FOREIGN PATENT DOCUMENTS

| | | |
|---|---|---|
| WO | WO-2013/130956 A1 | 9/2013 |
| WO | WO-2017/062897 A1 | 4/2017 |

OTHER PUBLICATIONS

Afram et al., "Theory and Application of HVAC Control Systems—A review of Model Predictive Control (MPC)," Building and Environment, Feb. 2014, vol. 72 (pp. 343-355).

Ahn et al., "Optimal Control Development for Chilled Water Plants Using a Quadratic Representation," Energy and Buildings, Apr. 2001, vol. 33, No. 4 (pp. 371-378).

Burer et al., "Non-convex Mixed-Integer Nonlinear Programming: A Survey," Surveys in Operations Research and Management Science, Jul. 2012, vol. 17, No. 2 (pp. 97-106).

Cantoni, A., "Optimal Curve Fitting with Piecewise Linear Functions," IEEE Transactions on Computers, Jan. 1971, vol. 20, No. (pp. 59-67).

Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).

Drgona et al., "All you Need to Know about Model Predictive Control for Buildings," Annual Reviews in Control, 2020, vol. 50 (pp. 190-232).

EPO Notice of Opposition to a European Patent issued in Appl. Ser. No. EP 16165681.4 dated May 2, 2023 (48 pages).

EPO Notice of Opposition to a European Patent issued in Appl. Ser. No. EP 16165681.4 dated May 2, 2023 (51 pages).

EPO Notice of Opposition to a European Patent with Consolidated List issued in EP Appl. Ser. No. 16165681.4 dated May 2, 2023 (4 pages).

EPO Office Action on EP Appl. Ser. No. 16165681.4 dated Apr. 6, 2021 (7 pages).

Extended European Search Report on EP Appl. Ser. No. 16165681.4 dated Oct. 20, 2016 (5 pages).

Extended European Search Report on EP Appl. Ser. No. 22177772.5 dated Sep. 26, 2022 (11 pages).

Hackner, J.R., "HVAC system dynamics and energy use in existing buildings," Doctoral Dissertation, University of Madison, Wisconsin, 1984 (174 pages).

Haves et al., "Model Predictive Control of HVAC Systems: Implementation and Testing at the University of California, Merced," Technical Report, U.S. Department of Energy Office of Scientific and Technical Information, Jun. 29, 2010 (140 pages).

Huang et al., "A New Model Predictive Control Scheme for Energy and Cost Savings in Commercial Buildings: An Airport Terminal Building Case Study," Building and Environment, Jul. 2015, vol. 89 (pp. 203-216).

Kelman et al., "Analysis of Local Optima in Predictive Control for Energy Efficient Buildings," Journal of Building Performance Simulation, Apr. 16, 2012, vol. 6, No. 3 (pp. 236-255).

Koehler et al., "Building Temperature Distributed Control via Explicit MPC and 'Trim and Respond' Methods," European Control Conference (ECC), Jul. 17-19, 2013, Zurich, Switzerland (pp. 4334-4339).

Kwadzogah et al., "Model Predictive Control for HVAC Systems—A Review," 2013 IEEE International Conference on Automation Science and Engineering, Model Predictive Control for HVAC Systems—A Review, 2013 IEEE International Conference on Automation Science and Engineering (CASE), Madison, WI, United States, Aug. 17-20, 2013 (pp. 442-447).

McKenna et al., "A TRNSYS model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).

Mossolly et al., "Optimal Control Strategy for a Multizone Air Conditioning System Using a Genetic Algorithm," Energy, Jan. 2009, vol. 34, No. 1 (pp. 58-66).

Nassif et al., "Optimization of HVAC Control System Strategy Using Two-Objective genetic Algorithm," International Journal of HVA C&R Research, vol. 11, No. 3 (pp. 459-486).

Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).

Stluka et al., "Energy Management for Buildings and Microgrids," 2011 50th IEEE Conference on Decision and Control and European Control Conference (CDCECC) Orlando, FL, USA, Dec. 12- 15, 2011 (pp. 5150-5157).

(56) References Cited

OTHER PUBLICATIONS

Strurznegger, D., "Model Predictive Building Climate Control, Steps Towards Practice," Doctoral Thesis, Automatic Control Laboratory, Zurich, Switzerland, 2014 (176 pages).
Sun et al., Optimal Control of Building HVAC&R Systems Using Complete Simulation-Based Sequential Quadratic Programming (CSB-SQP), Building and Environment, May 2005, vol. 40, No. 5 (pp. 657-669).
Third Party Observation Report on EP Appl. Ser. No. 16165681.4 dated Jan. 15, 2020 (8 pages).
Third Party Observation Report on EP Appl. Ser. No. 16165681.4 dated Oct. 5, 2018 (6 pages).
Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).
Verhelst, C., "Model Predictive Control of Ground Coupled Heat Pump Systems in Office Buildings," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).
Wang et al., "Model-Based Optimal Control of VAV Air-Conditioning System Using Genetic Algorithm," Building and Environment, Aug. 2000, vol. 35, No. 6 (pp. 471-487).
Wang et al., "Supervisory and Optimal Control of Building HVAC Systems: A Review," HVAC&R Research, Jan. 2008, vol. 14, No. 1 (pp. 3-32).
Xi et al., "Support Vector Regression Model Predictive Control on a HVAC Plant," Control Engineering Practice, Aug. 2007, vol. 15, No. 8 (pp. 897-908).
Yao et al., "Global Optimization of a Central Air-Conditioning System Using Decomposition-Coordination Method," Energy and Buildings, May 2010, vol. 42, No. 5 (pp. 570-583).
Accenture, "Energy Market Forces: Friend or Foe?," Accenture, URL: https://www.accenture.com/_acnmedia/accenture/conversion-assets/landingpage/documents/local/1/accenture-energy-market-forces.pdf, 2014, 8 Pages.
Bessembinder et al., "Equilibrium Pricing and Optimal Hedging in Electricity Forward Markets," The Journal of Finance, 57:3, Jun. 2002, pp. 1347-1382.
CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
EP Office Action on EP Appl. Ser. No. 19 217 287.2 dated Mar. 13, 2023 (11 pages).
EP Office Action on EP Appl. Ser. No. 19217287.2 dated Jan. 5, 2022 (3 pages).
Extended European Search Report on EP Appl. Ser. No. 19217287.2 dated May 4, 2020 (8 pages).
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).

(56) References Cited

OTHER PUBLICATIONS

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

Johnson, David, "CoolingLogic™: Mosaic Christian Church a Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

* cited by examiner

BUILDING ENERGY SYSTEM WITH LOAD-FOLLOWING-BLOCK RESOURCE ALLOCATION

CROSS-REFERENCE TO RELATED PATENT APPLICATIONS

This application is a continuation of U.S. patent application Ser. No. 17/395,672 filed Aug. 6, 2021, which is a continuation of U.S. patent application Ser. No. 16/223,746 filed Dec. 18, 2018 (now U.S. Pat. No. 11,164,126), all of which are incorporated by reference herein in their entireties.

BACKGROUND

The present disclosure relates generally to a central energy facility, and more particularly to cost optimization for a central energy facility subject to a block-and-index rate structure or a load-following-block rate structure. Minimizing costs may be a goal of building systems and energy systems. New pricing schemes such as block-and-index rate structures or load-following-block rate structures may require solutions for operating equipment to achieve optimal costs under such pricing schemes.

SUMMARY

One embodiment of the invention is a building energy system. The building energy system includes equipment operable to consume, store, or generate one or more resources and a utility connection configured to obtain, from a utility provider, a first resource of the one or more resources subject to a block-and-index rate structure and provide the first resource to the equipment. The building energy system also includes a controller configured to obtain a cost function that includes a total cost of purchasing the first resource from the utility provider at each of a plurality of time steps of an optimization period. The cost function represents a block of the at least one of energy or power from the utility provider as being sourced from a first supplier at a fixed rate and represents a remainder of the first resource from the utility provider as being sourced from a second supplier at a variable rate. The controller is also configured to optimize the cost function subject to one or more constraints to generate values for one or more decision variables that indicate an amount of the one or more resources to purchase, store, generate, or consume at each of the plurality of time steps of the optimization period. The controller is also configured to control the equipment to achieve the values of the one or more decision variables at each of the plurality of time steps of the optimization period.

In some embodiments, the controller is configured to set the fixed rate to zero. In some embodiments, the first resource is metered in units of energy. The cost function and the one or more constraints represent the first supplier as an energy storage device having a capacity equal to a size of the block.

In some embodiments, the first resource includes natural gas. In some embodiments, the first resource is metered in units of power. The one or more constraints require that an amount of the first resource purchased at the fixed rate at each time step is less than or equal to a size of the block.

In some embodiments, the first resource includes electricity.

In some embodiments, a size of the block is selectable at a beginning of a calendar period. The controller is configured to determine an optimal size of the block. The controller is configured to automatically select the size of the block and provide an indication of the optimal size of the block to the utility provider.

In some embodiments, a size of the block is user selectable.

Another implementation of the present disclosure is a method for allocating resources in a building energy system. The method includes operating equipment to consume, store, or generate one or more resources, receiving a first resource of the one or more resources from a utility provider subject to a block-and-index rate structure, providing the first resource to the equipment, and allocating the one or more resources amongst the equipment. Allocating the one or more resources amongst the equipment includes obtaining a cost function that includes a total cost of purchasing the first resource from the utility provider at each of a plurality of time steps of an optimization period. The cost function represents a block of the first resource from the utility provider as sourced from a first supplier at a fixed rate and representing a remainder of the first resource from the utility provider as sourced from a second supplier at a variable rate.

Allocating the one or more resources amongst the equipment also includes performing an optimization process for the cost function subject to one or more constraints to generate values for one or more decision variables that indicate an amount of the one or more resources to purchase, store, generate, or consume at each of the plurality of time steps of the optimization period. The method includes controlling the equipment to achieve the values of the one or more decision variables at each of the plurality of time steps of the optimization period.

In some embodiments, the controller is configured to set the fixed rate to zero. In some embodiments, the first resource is metered in units of energy. Optimizing the cost function includes representing the first supplier as an energy storage device having a capacity equal to a size of the block.

In some embodiments, the first resource includes natural gas. In some embodiments, the first resource is metered in units of power. In some embodiments, the one or more constraints require that an amount of the first resource purchased at the fixed rate at each time step is less than or equal to a size of the block.

In some embodiments, the first resource includes electricity. The method includes determining an optimal size of the block.

In some embodiments, a size of the block is selectable at a beginning of a calendar period. The method includes automatically selecting the size of the block and providing an indication of the optimal size of the block to the utility provider.

In some embodiments, the method includes receiving an input of a size of the block from a user.

Another implementation of the present disclosure is a method for allocating resources in a building energy system. The method includes operating equipment to consume, store, or generate one or more resources and receiving a first resource of the one or more resources from a utility provider subject to a block-and-index rate structure. The block-and-index rate structure assigns a fixed rate to a block of the first resource and a variable rate to a remainder of the first resource. The method also includes selecting an optimal size of the block by obtaining a cost function that includes a total cost of purchasing the first resource from the utility provider over an upcoming time period, the cost function comprising a decision variable treating a size of the block as a peak demand auxiliary variable and optimizing the cost function to determine the optimal size of the block as the size of the block that minimizes the total cost of purchasing the first resources from the utility provider for the upcoming time period. The method also includes providing an indication of the optimal size of the block to the utility provider to enroll in the block-and-index rate structure for the upcoming time period with the block having the optimal size and controlling the equipment to consume a total amount of the first resource. The block is priced at the fixed rate and the remainder is priced at the variable rate. The block has the optimal size.

In some embodiments, optimizing the cost function includes generating a plurality of scenarios of possible loads and possible variable rates for the upcoming time period. The optimal size of the block minimizes the total cost of purchasing the first resource over all of the plurality of scenarios. In some embodiments, generating the plurality of possible loads and possible index rates for the time period includes storing a history of past scenarios comprising actual values for historical loads and historical variable rates and at least one of sampling the possible loads and possible index rates from the history of past scenarios; or generating an estimated distribution based on the history of past scenarios and sampling the possible loads and possible variable rates from the estimated distribution.

In some embodiments, optimizing the cost function to determine the optimal size of the block includes selecting a plurality of possible block sizes, evaluating the cost function for each possible block size to determine a simulated cost for each of the possible block sizes, fitting a model to the simulated costs, determining the a size of the block that minimizes the predicted total cost by minimizing the model with respect to the size of the block, and selecting the optimal size of the block as the size of the block that minimizes the predicted total cost. In some embodiments, minimizing the model with respect to the size of the block comprises performing at least one of gradient descent, a golden section search, a Fibonacci search, or Newton's method.

DETAILED DESCRIPTION

Figure 1:
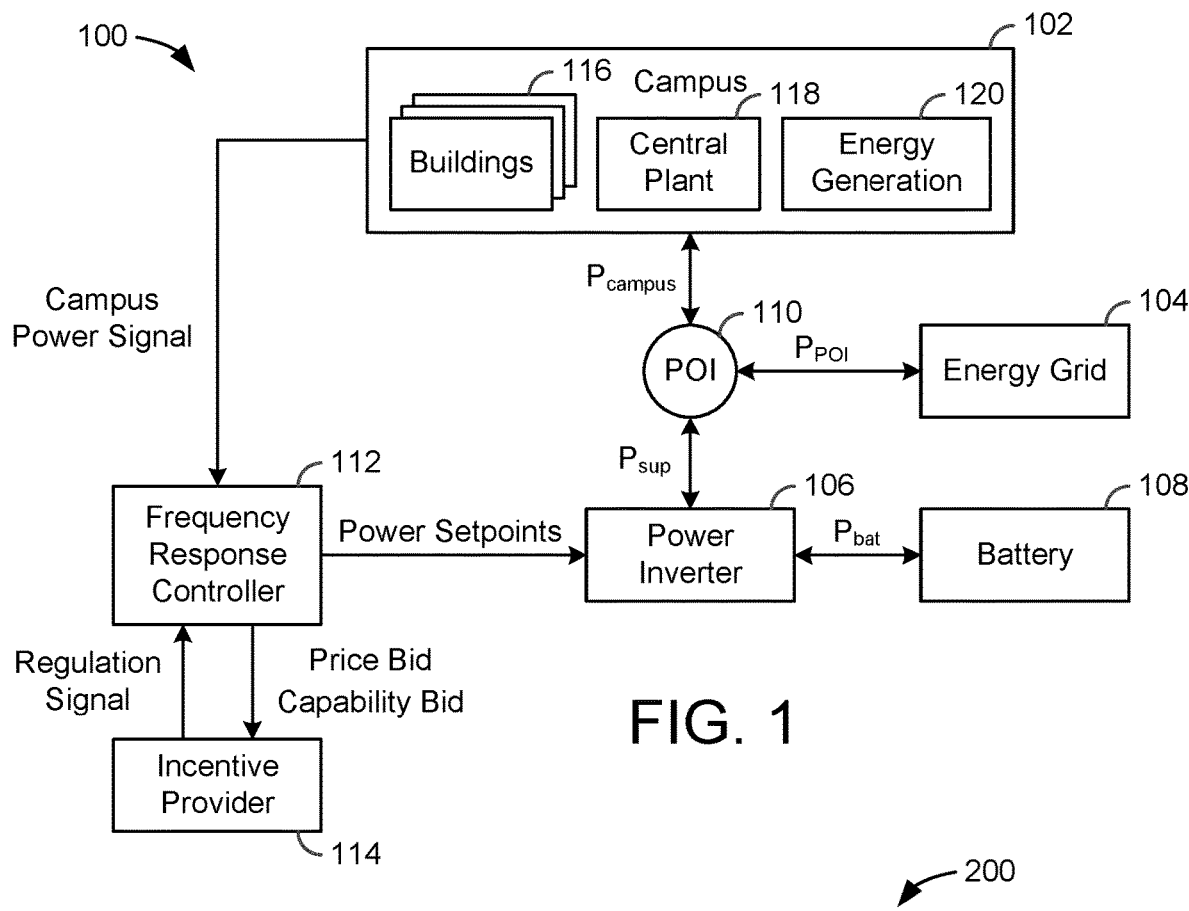
FIG. 1 is a block diagram of a frequency response optimization system, according to an exemplary embodiment.

Referring generally to the FIGURES, a building energy system with stochastic model predictive control and demand charge incorporation is shown according to various exemplary embodiments. The building energy system can include some or all of the components of a frequency response optimization system 100, photovoltaic energy system 300, energy storage system 500, energy storage controller 506, and/or planning tool 702, as described with reference to FIGS. 1-8. The stochastic model predictive control and demand charge incorporation features are described in detail with reference to FIGS. 9-17.

Frequency Response Optimization System

Referring now to FIG. 1, a frequency response optimization system 100 is shown, according to an exemplary embodiment. System 100 is shown to include a campus 102 and an energy grid 104. Campus 102 may include one or more buildings 116 that receive power from energy grid 104. Buildings 116 may include equipment or devices that consume electricity during operation. For example, buildings 116 may include HVAC equipment, lighting equipment, security equipment, communications equipment, vending machines, computers, electronics, elevators, or other types of building equipment.

In some embodiments, buildings 116 are served by a building management system (BMS). A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices. An exemplary building management system which may be used to monitor and control buildings 116 is described in U.S. patent application Ser. No. 14/717,593 filed May 20, 2015, the entire disclosure of which is incorporated by reference herein.

In some embodiments, campus 102 includes a central plant 118. Central plant 118 may include one or more subplants that consume resources from utilities (e.g., water, natural gas, electricity, etc.) to satisfy the loads of buildings 116. For example, central plant 118 may include a heater subplant, a heat recovery chiller subplant, a chiller subplant, a cooling tower subplant, a hot thermal energy storage (TES) subplant, and a cold thermal energy storage (TES) subplant, a steam subplant, and/or any other type of subplant configured to serve buildings 116. The subplants may be configured to convert input resources (e.g., electricity, water, natural gas, etc.) into output resources (e.g., cold water, hot water, chilled air, heated air, etc.) that are provided to buildings 116. An exemplary central plant which may be used to satisfy the loads of buildings 116 is described U.S. patent application Ser. No. 14/634,609 filed Feb. 27, 2015, the entire disclosure of which is incorporated by reference herein.

In some embodiments, campus 102 includes energy generation 120. Energy generation 120 may be configured to generate energy that can be used by buildings 116, used by central plant 118, and/or provided to energy grid 104. In some embodiments, energy generation 120 generates electricity. For example, energy generation 120 may include an electric power plant, a photovoltaic energy field, or other types of systems or devices that generate electricity. The electricity generated by energy generation 120 can be used internally by campus 102 (e.g., by buildings 116 and/or central plant 118) to decrease the amount of electric power that campus 102 receives from outside sources such as energy grid 104 or battery 108. If the amount of electricity generated by energy generation 120 exceeds the electric power demand of campus 102, the excess electric power can be provided to energy grid 104 or stored in battery 108. The power output of campus 102 is shown in FIG. 1 as $P_{campus}$. $P_{campus}$ may be positive if campus 102 is outputting electric power or negative if campus 102 is receiving electric power.

Still referring to FIG. 1, system 100 is shown to include a power inverter 106 and a battery 108. Power inverter 106 may be configured to convert electric power between direct current (DC) and alternating current (AC). For example, battery 108 may be configured to store and output DC power, whereas energy grid 104 and campus 102 may be configured to consume and generate AC power. Power inverter 106 may be used to convert DC power from battery 108 into a sinusoidal AC output synchronized to the grid frequency of energy grid 104. Power inverter 106 may also be used to convert AC power from campus 102 or energy grid 104 into DC power that can be stored in battery 108. The power output of battery 108 is shown as $P_{bat}$. $P_{bat}$ may be positive if battery 108 is providing power to power inverter 106 or negative if battery 108 is receiving power from power inverter 106.

In some embodiments, power inverter 106 receives a DC power output from battery 108 and converts the DC power output to an AC power output. The AC power output can be used to satisfy the energy load of campus 102 and/or can be provided to energy grid 104. Power inverter 106 may synchronize the frequency of the AC power output with that of energy grid 104 (e.g., 50 Hz or 60 Hz) using a local oscillator and may limit the voltage of the AC power output to no higher than the grid voltage. In some embodiments, power inverter 106 is a resonant inverter that includes or uses LC circuits to remove the harmonics from a simple square wave in order to achieve a sine wave matching the frequency of energy grid 104. In various embodiments, power inverter 106 may operate using high-frequency transformers, low-frequency transformers, or without transformers. Low-frequency transformers may convert the DC output from battery 108 directly to the AC output provided to energy grid 104. High-frequency transformers may employ a multi-step process that involves converting the DC output to high-frequency AC, then back to DC, and then finally to the AC output provided to energy grid 104.

System 100 is shown to include a point of interconnection (POI) 110. POI 110 is the point at which campus 102, energy grid 104, and power inverter 106 are electrically connected. The power supplied to POI 110 from power inverter 106 is shown as $P_{sup}$. $P_{sup}$ may be defined as $P_{bat}+P_{loss}$, where $P_{batt}$ is the battery power and $P_{loss}$ is the power loss in the battery system (e.g., losses in power inverter 106 and/or battery 108). $P_{bat}$ and $P_{sup}$ may be positive if power inverter 106 is providing power to POI 110 or negative if power inverter 106 is receiving power from POI 110. $P_{campus}$ and $P_{sup}$ combine at POI 110 to form $P_{POI}$. $P_{POI}$ may be defined as the power provided to energy grid 104 from POI 110. $P_{POI}$ may be positive if POI 110 is providing power to energy grid 104 or negative if POI 110 is receiving power from energy grid 104.

Still referring to FIG. 1, system 100 is shown to include a frequency response controller 112. Controller 112 may be configured to generate and provide power setpoints to power inverter 106. Power inverter 106 may use the power setpoints to control the amount of power $P_{sup}$ provided to POI 110 or drawn from POI 110. For example, power inverter 106 may be configured to draw power from POI 110 and store the power in battery 108 in response to receiving a negative power setpoint from controller 112. Conversely, power inverter 106 may be configured to draw power from battery 108 and provide the power to POI 110 in response to receiving a positive power setpoint from controller 112. The magnitude of the power setpoint may define the amount of power $P_{sup}$ provided to or from power inverter 106. Controller 112 may be configured to generate and provide power setpoints that optimize the value of operating system 100 over a time horizon.

In some embodiments, frequency response controller 112 uses power inverter 106 and battery 108 to perform frequency regulation for energy grid 104. Frequency regulation is the process of maintaining the stability of the grid frequency (e.g., 60 Hz in the United States). The grid frequency may remain stable and balanced as long as the total electric supply and demand of energy grid 104 are balanced. Any deviation from that balance may result in a deviation of the grid frequency from its desirable value. For example, an increase in demand may cause the grid frequency to decrease, whereas an increase in supply may cause the grid frequency to increase. Frequency response controller 112 may be configured to offset a fluctuation in the grid frequency by causing power inverter 106 to supply energy from battery 108 to energy grid 104 (e.g., to offset a decrease in grid frequency) or store energy from energy grid 104 in battery 108 (e.g., to offset an increase in grid frequency).

In some embodiments, frequency response controller 112 uses power inverter 106 and battery 108 to perform load shifting for campus 102. For example, controller 112 may cause power inverter 106 to store energy in battery 108 when energy prices are low and retrieve energy from battery 108 when energy prices are high in order to reduce the cost of electricity required to power campus 102. Load shifting may also allow system 100 reduce the demand charge incurred. Demand charge is an additional charge imposed by some utility providers based on the maximum power consumption during an applicable demand charge period. For example, a demand charge rate may be specified in terms of dollars per unit of power (e.g., $/kW) and may be multiplied by the peak power usage (e.g., kW) during a demand charge period to calculate the demand charge. Load shifting may allow system 100 to smooth momentary spikes in the electric demand of campus 102 by drawing energy from battery 108 in order to reduce peak power draw from energy grid 104, thereby decreasing the demand charge incurred.

Still referring to FIG. 1, system 100 is shown to include an incentive provider 114. Incentive provider 114 may be a utility (e.g., an electric utility), a regional transmission organization (RTO), an independent system operator (ISO), or any other entity that provides incentives for performing frequency regulation. For example, incentive provider 114 may provide system 100 with monetary incentives for participating in a frequency response program. In order to participate in the frequency response program, system 100 may maintain a reserve capacity of stored energy (e.g., in battery 108) that can be provided to energy grid 104. System 100 may also maintain the capacity to draw energy from energy grid 104 and store the energy in battery 108. Reserving both of these capacities may be accomplished by managing the state-of-charge of battery 108.

Frequency response controller 112 may provide incentive provider 114 with a price bid and a capability bid. The price bid may include a price per unit power (e.g., $/MW) for reserving or storing power that allows system 100 to participate in a frequency response program offered by incentive provider 114. The price per unit power bid by frequency response controller 112 is referred to herein as the "capability price." The price bid may also include a price for actual performance, referred to herein as the "performance price." The capability bid may define an amount of power (e.g., MW) that system 100 will reserve or store in battery 108 to perform frequency response, referred to herein as the "capability bid."

Incentive provider 114 may provide frequency response controller 112 with a capability clearing price $CP_{cap}$, a performance clearing price $C_{Pperf}$, and a regulation award $Reg_{award}$, which correspond to the capability price, the performance price, and the capability bid, respectively. In some embodiments, $CP_{cap}$, $CP_{perf}$, and $Reg_{award}$ are the same as the corresponding bids placed by controller 112. In other embodiments, $CP_{cap}$, $CP_{perf}$, and $Reg_{award}$ may not be the same as the bids placed by controller 112. For example, $CP_{cap}$, $CP_{perf}$, and $Reg_{award}$ may be generated by incentive provider 114 based on bids received from multiple participants in the frequency response program. Controller 112 may use $CP_{cap}$, $CP_{perf}$, and $Reg_{award}$ to perform frequency regulation.

Frequency response controller 112 is shown receiving a regulation signal from incentive provider 114. The regulation signal may specify a portion of the regulation award $Reg_{award}$ that frequency response controller 112 is to add or remove from energy grid 104. In some embodiments, the regulation signal is a normalized signal (e.g., between −1 and 1) specifying a proportion of $Reg_{award}$. Positive values of the regulation signal may indicate an amount of power to add to energy grid 104, whereas negative values of the regulation signal may indicate an amount of power to remove from energy grid 104.

Frequency response controller 112 may respond to the regulation signal by generating an optimal power setpoint for power inverter 106. The optimal power setpoint may take into account both the potential revenue from participating in the frequency response program and the costs of participation. Costs of participation may include, for example, a monetized cost of battery degradation as well as the energy and demand charges that will be incurred. The optimization may be performed using sequential quadratic programming, dynamic programming, or any other optimization technique.

In some embodiments, controller 112 uses a battery life model to quantify and monetize battery degradation as a function of the power setpoints provided to power inverter 106. Advantageously, the battery life model allows controller 112 to perform an optimization that weighs the revenue generation potential of participating in the frequency response program against the cost of battery degradation and other costs of participation (e.g., less battery power available for campus 102, increased electricity costs, etc.). An exemplary regulation signal and power response are described in greater detail with reference to FIG. 2.

Figure 2:
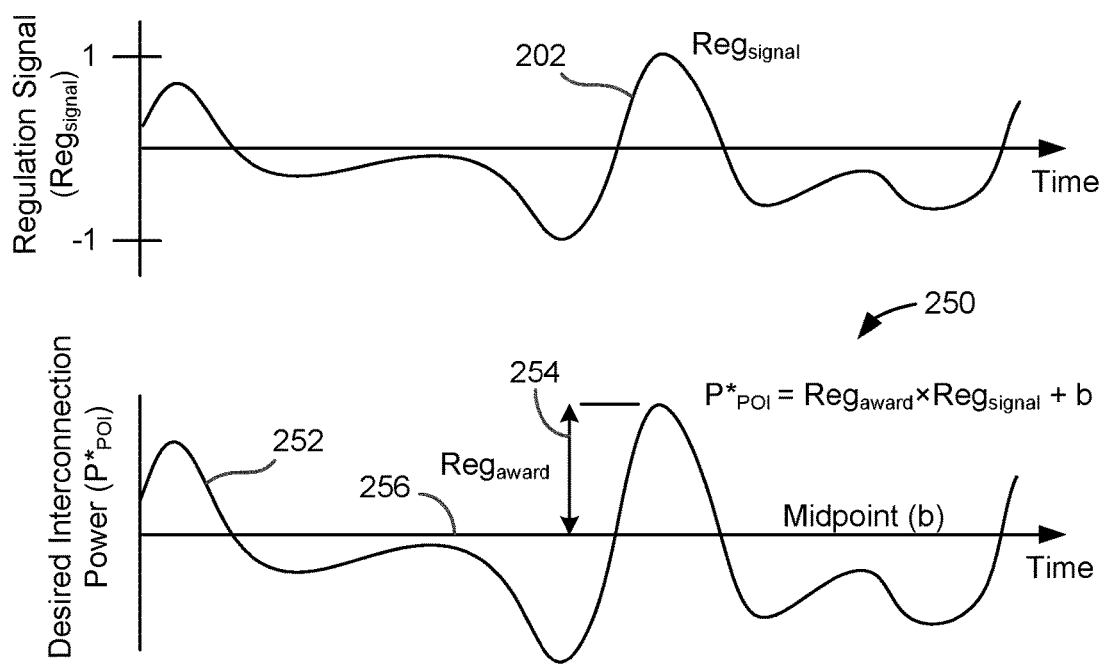
FIG. 2 is a graph of a regulation signal which may be provided to the system of FIG. 1 and a frequency response signal which may be generated by the system of FIG. 1, according to an exemplary embodiment.

Referring now to FIG. 2, a pair of frequency response graphs 200 and 250 are shown, according to an exemplary embodiment. Graph 200 illustrates a regulation signal $Reg_{signal}$ 202 as a function of time. $Reg_{signal}$ 202 is shown as a normalized signal ranging from −1 to 1 (i.e., −1 ≤ $Reg_{signal}$ ≤ 1). $Reg_{signal}$ 202 may be generated by incentive provider 114 and provided to frequency response controller 112. $Reg_{signal}$ 202 may define a proportion of the regulation award $Reg_{award}$ 254 that controller 112 is to add or remove from energy grid 104, relative to a baseline value referred to as the midpoint b 256. For example, if the value of $Reg_{award}$ 254 is 10 MW, a regulation signal value of 0.5 (i.e., $Reg_{signal}$=0.5) may indicate that system 100 is requested to add 5 MW of power at POI 110 relative to midpoint b (e.g., $P_{POI}^*$=10 MW×0.5+b), whereas a regulation signal value of −0.3 may indicate that system 100 is requested to remove 3 MW of power from POI 110 relative to midpoint b (e.g., $P_{POI}^*$=10 MW×−0.3+b).

Graph 250 illustrates the desired interconnection power $PPo_1$ 252 as a function of time. $P_{POI}^*$ 252 may be calculated by frequency response controller 112 based on $Reg_{signal}$ 202, $Reg_{award}$ 254, and a midpoint b 256. For example, controller 112 may calculate $P_{POI}$ 252 using the following equation:

$$P_{POI}^* = Reg_{award} \times Reg_{signal} + b$$

where $P_{POI}^*$ represents the desired power at POI 110 (e.g., $P_{POI}^* = P_{sup} + P_{campus}$) and b is the midpoint. Midpoint b may be defined (e.g., set or optimized) by controller 112 and may represent the midpoint of regulation around which the load is modified in response to $Reg_{signal}$ 202. Optimal adjustment of midpoint b may allow controller 112 to actively participate in the frequency response market while also taking into account the energy and demand charge that will be incurred.

In order to participate in the frequency response market, controller 112 may perform several tasks. Controller 112 may generate a price bid (e.g., $/MW) that includes the capability price and the performance price. In some embodiments, controller 112 sends the price bid to incentive provider 114 at approximately 15:30 each day and the price bid remains in effect for the entirety of the next day. Prior to beginning a frequency response period, controller 112 may generate the capability bid (e.g., MW) and send the capability bid to incentive provider 114. In some embodiments, controller 112 generates and sends the capability bid to incentive provider 114 approximately 1.5 hours before a frequency response period begins. In an exemplary embodiment, each frequency response period has a duration of one hour; however, it is contemplated that frequency response periods may have any duration.

At the start of each frequency response period, controller 112 may generate the midpoint b around which controller 112 plans to perform frequency regulation. In some embodiments, controller 112 generates a midpoint b that will maintain battery 108 at a constant state-of-charge (SOC)

(i.e. a midpoint that will result in battery 108 having the same SOC at the beginning and end of the frequency response period). In other embodiments, controller 112 generates midpoint b using an optimization procedure that allows the SOC of battery 108 to have different values at the beginning and end of the frequency response period. For example, controller 112 may use the SOC of battery 108 as a constrained variable that depends on midpoint b in order to optimize a value function that takes into account frequency response revenue, energy costs, and the cost of battery degradation. Exemplary techniques for calculating and/or optimizing midpoint b under both the constant SOC scenario and the variable SOC scenario are described in detail in U.S. patent application Ser. No. 15/247,883 filed Aug. 25, 2016, U.S. patent application Ser. No. 15/247,885 filed Aug. 25, 2016, and U.S. patent application Ser. No. 15/247,886 filed Aug. 25, 2016. The entire disclosure of each of these patent applications is incorporated by reference herein.

During each frequency response period, controller 112 may periodically generate a power setpoint for power inverter 106. For example, controller 112 may generate a power setpoint for each time step in the frequency response period. In some embodiments, controller 112 generates the power setpoints using the equation:

$$P_{POI}^* = Reg_{award} \times Reg_{signal} + b$$

where $P_{POI}^* = P_{sup} + P_{campus}$. Positive values of $P_{POI}^*$ indicate energy flow from POI 110 to energy grid 104. Positive values of $P_{sup}$ and $P_{campus}$ indicate energy flow to POI 110 from power inverter 106 and campus 102, respectively.

In other embodiments, controller 112 generates the power setpoints using the equation:

$$P_{POI}^* = Reg_{award} \times Res_{FR} + b$$

where $Res_{FR}$ is an optimal frequency response generated by optimizing a value function. Controller 112 may subtract $P_{campus}$ from $P_{POI}^*$ to generate the power setpoint for power inverter 106 (i.e., $P_{sup} = P_{POI}^* - P_{campus}$). The power setpoint for power inverter 106 indicates the amount of power that power inverter 106 is to add to POI 110 (if the power setpoint is positive) or remove from POI 110 (if the power setpoint is negative). Exemplary techniques which can be used by controller 112 to calculate power inverter setpoints are described in detail in U.S. patent application Ser. No. 15/247,793 filed Aug. 25, 2016, U.S. patent application Ser. No. 15/247,784 filed Aug. 25, 2016, and U.S. patent application Ser. No. 15/247,777 filed Aug. 25, 2016. The entire disclosure of each of these patent applications is incorporated by reference herein.

Photovoltaic Energy System with Frequency Regulation and Ramp Rate Control

Figure 3:
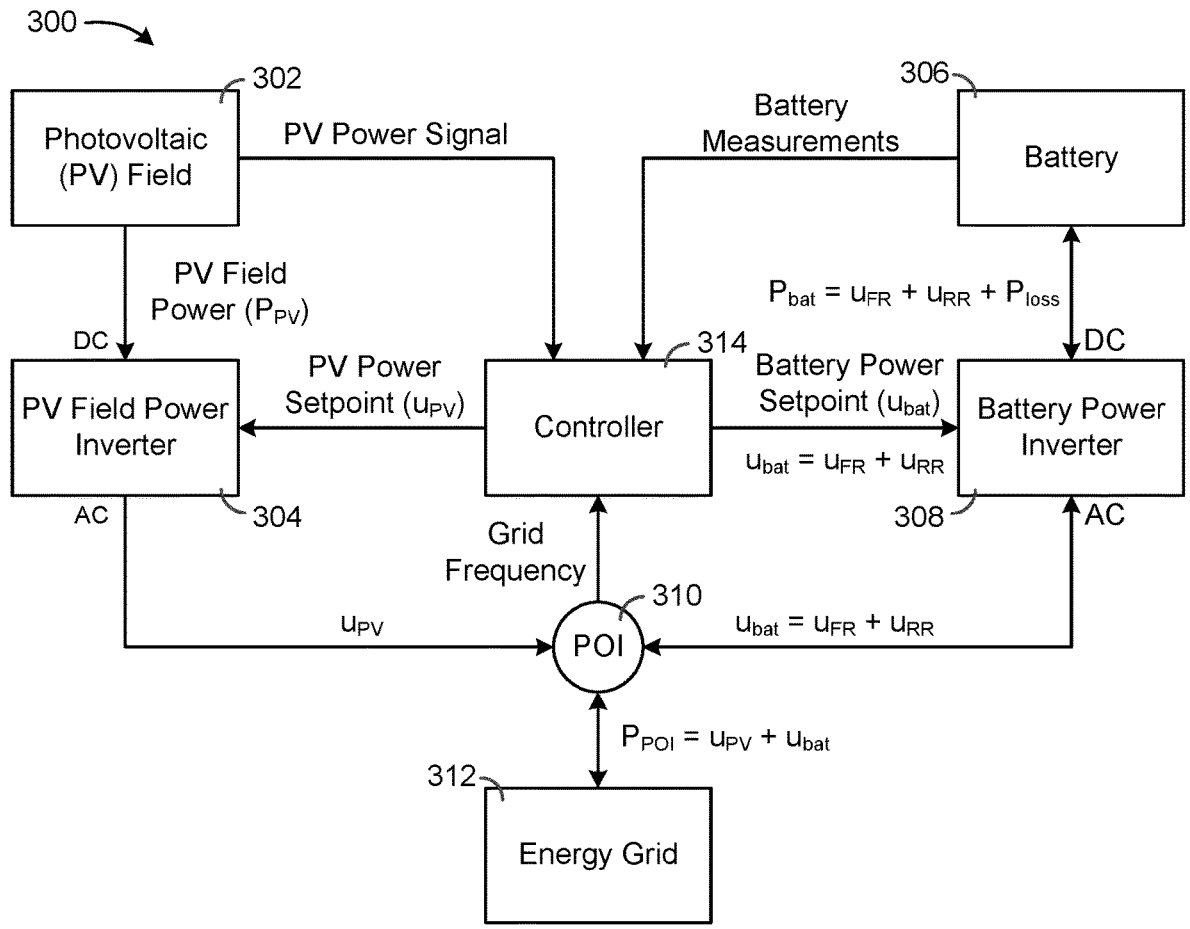
FIG. 3 is a block diagram of a photovoltaic energy system configured to simultaneously perform both ramp rate control and frequency regulation while maintaining the state-of-charge of a battery within a desired range, according to an exemplary embodiment.
Figure 4:
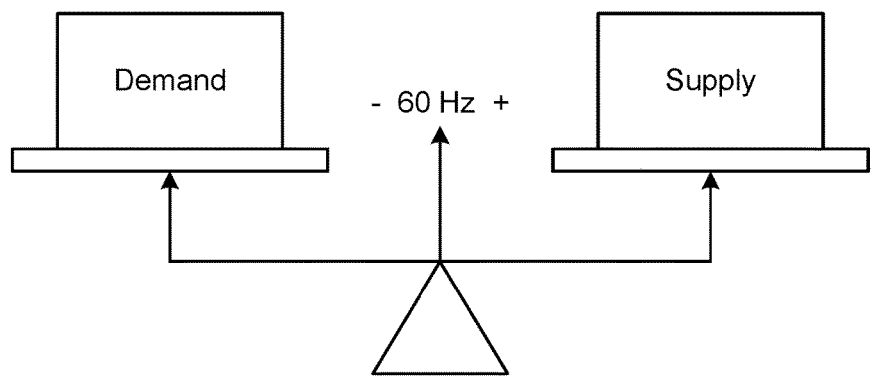
FIG. 4 is a drawing illustrating the electric supply to an energy grid and electric demand from the energy grid which must be balanced in order to maintain the grid frequency, according to an exemplary embodiment.

Referring now to FIGS. 3-4, a photovoltaic energy system 300 that uses battery storage to simultaneously perform both ramp rate control and frequency regulation is shown, according to an exemplary embodiment. Ramp rate control is the process of offsetting ramp rates (i.e., increases or decreases in the power output of an energy system such as a photovoltaic energy system) that fall outside of compliance limits determined by the electric power authority overseeing the energy grid. Ramp rate control typically requires the use of an energy source that allows for offsetting ramp rates by either supplying additional power to the grid or consuming more power from the grid. In some instances, a facility is penalized for failing to comply with ramp rate requirements.

Frequency regulation is the process of maintaining the stability of the grid frequency (e.g., 60 Hz in the United States). As shown in FIG. 4, the grid frequency may remain balanced at 60 Hz as long as there is a balance between the demand from the energy grid and the supply to the energy grid. An increase in demand yields a decrease in grid frequency, whereas an increase in supply yields an increase in grid frequency. During a fluctuation of the grid frequency, system 300 may offset the fluctuation by either drawing more energy from the energy grid (e.g., if the grid frequency is too high) or by providing energy to the energy grid (e.g., if the grid frequency is too low). Advantageously, system 300 may use battery storage in combination with photovoltaic power to perform frequency regulation while simultaneously complying with ramp rate requirements and maintaining the state-of-charge of the battery storage within a predetermined desirable range.

Referring particularly to FIG. 3, system 300 is shown to include a photovoltaic (PV) field 302, a PV field power inverter 304, a battery 306, a battery power inverter 308, a point of interconnection (POI) 310, and an energy grid 312. PV field 302 may include a collection of photovoltaic cells. The photovoltaic cells are configured to convert solar energy (i.e., sunlight) into electricity using a photovoltaic material such as monocrystalline silicon, polycrystalline silicon, amorphous silicon, cadmium telluride, copper indium gallium selenide/sulfide, or other materials that exhibit the photovoltaic effect. In some embodiments, the photovoltaic cells are contained within packaged assemblies that form solar panels. Each solar panel may include a plurality of linked photovoltaic cells. The solar panels may combine to form a photovoltaic array.

PV field 302 may have any of a variety of sizes and/or locations. In some embodiments, PV field 302 is part of a large-scale photovoltaic power station (e.g., a solar park or farm) capable of providing an energy supply to a large number of consumers. When implemented as part of a large-scale system, PV field 302 may cover multiple hectares and may have power outputs of tens or hundreds of megawatts. In other embodiments, PV field 302 may cover a smaller area and may have a relatively lesser power output (e.g., between one and ten megawatts, less than one megawatt, etc.). For example, PV field 302 may be part of a rooftop-mounted system capable of providing enough electricity to power a single home or building. It is contemplated that PV field 302 may have any size, scale, and/or power output, as may be desirable in different implementations.

PV field 302 may generate a direct current (DC) output that depends on the intensity and/or directness of the sunlight to which the solar panels are exposed. The directness of the sunlight may depend on the angle of incidence of the sunlight relative to the surfaces of the solar panels. The intensity of the sunlight may be affected by a variety of environmental factors such as the time of day (e.g., sunrises and sunsets) and weather variables such as clouds that cast shadows upon PV field 302. When PV field 302 is partially or completely covered by shadow, the power output of PV field 302 (i.e., PV field power $P_{PV}$) may drop as a result of the decrease in solar intensity.

In some embodiments, PV field 302 is configured to maximize solar energy collection. For example, PV field 302 may include a solar tracker (e.g., a GPS tracker, a sunlight sensor, etc.) that adjusts the angle of the solar panels so that the solar panels are aimed directly at the sun throughout the day. The solar tracker may allow the solar panels to receive direct sunlight for a greater portion of the day and may increase the total amount of power produced by PV field 302. In some embodiments, PV field 302 includes a collection of mirrors, lenses, or solar concentrators configured to direct and/or concentrate sunlight on the solar panels. The energy generated by PV field 302 may be stored in battery 306 or provided to energy grid 312.

Still referring to FIG. 3, system 300 is shown to include a PV field power inverter 304. Power inverter 304 may be configured to convert the DC output of PV field 302 $P_{PV}$ into an alternating current (AC) output that can be fed into energy grid 312 or used by a local (e.g., off-grid) electrical network. For example, power inverter 304 may be a solar inverter or grid-tie inverter configured to convert the DC output from PV field 302 into a sinusoidal AC output synchronized to the grid frequency of energy grid 312. In some embodiments, power inverter 304 receives a cumulative DC output from PV field 302. For example, power inverter 304 may be a string inverter or a central inverter. In other embodiments, power inverter 304 may include a collection of micro-inverters connected to each solar panel or solar cell. PV field power inverter 304 may convert the DC power output $P_{PV}$ into an AC power output $u_{PV}$ and provide the AC power output $u_{PV}$ to POI 310.

Power inverter 304 may receive the DC power output $P_{PV}$ from PV field 302 and convert the DC power output to an AC power output that can be fed into energy grid 312. Power inverter 304 may synchronize the frequency of the AC power output with that of energy grid 312 (e.g., 50 Hz or 60 Hz) using a local oscillator and may limit the voltage of the AC power output to no higher than the grid voltage. In some embodiments, power inverter 304 is a resonant inverter that includes or uses LC circuits to remove the harmonics from a simple square wave in order to achieve a sine wave matching the frequency of energy grid 312. In various embodiments, power inverter 304 may operate using high-frequency transformers, low-frequency transformers, or without transformers. Low-frequency transformers may convert the DC output from PV field 302 directly to the AC output provided to energy grid 312. High-frequency transformers may employ a multi-step process that involves converting the DC output to high-frequency AC, then back to DC, and then finally to the AC output provided to energy grid 312.

Power inverter 304 may be configured to perform maximum power point tracking and/or anti-islanding. Maximum power point tracking may allow power inverter 304 to produce the maximum possible AC power from PV field 302. For example, power inverter 304 may sample the DC power output from PV field 302 and apply a variable resistance to find the optimum maximum power point. Anti-islanding is a protection mechanism that immediately shuts down power inverter 304 (i.e., preventing power inverter 304 from generating AC power) when the connection to an electricity-consuming load no longer exists. In some embodiments, PV field power inverter 304 performs ramp rate control by limiting the power generated by PV field 302.

Still referring to FIG. 3, system 300 is shown to include a battery power inverter 308. Battery power inverter 308 may be configured to draw a DC power $P_{bat}$ from battery 306, convert the DC power $P_{bat}$ into an AC power $u_{bat}$, and provide the AC power $u_{bat}$ to POI 310. Battery power inverter 308 may also be configured to draw the AC power $u_{bat}$ from POI 310, convert the AC power $u_{bat}$ into a DC battery power $P_{bat}$, and store the DC battery power $P_{bat}$ in battery 306. The DC battery power $P_{bat}$ may be positive if battery 306 is providing power to battery power inverter 308 (i.e., if battery 306 is discharging) or negative if battery 306 is receiving power from battery power inverter 308 (i.e., if battery 306 is charging). Similarly, the AC battery power $u_{bat}$ may be positive if battery power inverter 308 is providing power to POI 310 or negative if battery power inverter 308 is receiving power from POI 310.

The AC battery power $u_{bat}$ is shown to include an amount of power used for frequency regulation (i.e., $u_{FR}$) and an amount of power used for ramp rate control (i.e., $u_{RR}$) which together form the AC battery power (i.e., $u_{bat}=u_{FR}+u_{RR}$). The DC battery power $P_{bat}$ is shown to include both $u_{FR}$ and $u_{RR}$ as well as an additional term $P_{loss}$ representing power losses in battery 306 and/or battery power inverter 308 (i.e., $P_{bat}=u_{FR}+u_{RR}+P_{loss}$). The PV field power $u_{PV}$ and the battery power $u_{bat}$ combine at POI 110 to form $P_{POI}$ (i.e., $P_{POI}=u_{PV}+u_{bat}$), which represents the amount of power provided to energy grid 312. $P_{POI}$ may be positive if POI 310 is providing power to energy grid 312 or negative if POI 310 is receiving power from energy grid 312.

Still referring to FIG. 3, system 300 is shown to include a controller 314. Controller 314 may be configured to generate a PV power setpoint $u_{PV}$ for PV field power inverter 304 and a battery power setpoint $u_{bat}$ for battery power inverter 308. Throughout this disclosure, the variable $u_{PV}$ is used to refer to both the PV power setpoint generated by controller 314 and the AC power output of PV field power inverter 304 since both quantities have the same value. Similarly, the variable $u_{bat}$ is used to refer to both the battery power setpoint generated by controller 314 and the AC power output/input of battery power inverter 308 since both quantities have the same value.

PV field power inverter 304 uses the PV power setpoint $u_{PV}$ to control an amount of the PV field power $P_{PV}$ to provide to POI 110. The magnitude of $u_{PV}$ may be the same as the magnitude of $P_{PV}$ or less than the magnitude of $P_{PV}$. For example, $u_{PV}$ may be the same as $P_{PV}$ if controller 314 determines that PV field power inverter 304 is to provide all of the photovoltaic power $P_{PV}$ to POI 310. However, $u_{PV}$ may be less than $P_{PV}$ if controller 314 determines that PV field power inverter 304 is to provide less than all of the photovoltaic power $P_{PV}$ to POI 310. For example, controller 314 may determine that it is desirable for PV field power inverter 304 to provide less than all of the photovoltaic power $P_{PV}$ to POI 310 to prevent the ramp rate from being exceeded and/or to prevent the power at POI 310 from exceeding a power limit.

Battery power inverter 308 uses the battery power setpoint $u_{bat}$ to control an amount of power charged or discharged by battery 306. The battery power setpoint $u_{bat}$ may be positive if controller 314 determines that battery power inverter 308 is to draw power from battery 306 or negative if controller 314 determines that battery power inverter 308 is to store power in battery 306. The magnitude of $u_{bat}$ controls the rate at which energy is charged or discharged by battery 306.

Controller 314 may generate $u_{PV}$ and $u_{bat}$ based on a variety of different variables including, for example, a power signal from PV field 302 (e.g., current and previous values for $P_{PV}$), the current state-of-charge (SOC) of battery 306, a maximum battery power limit, a maximum power limit at POI 310, the ramp rate limit, the grid frequency of energy grid 312, and/or other variables that can be used by controller 314 to perform ramp rate control and/or frequency regulation. Advantageously, controller 314 generates values for $u_{PV}$ and $u_{bat}$ that maintain the ramp rate of the PV power within the ramp rate compliance limit while participating in the regulation of grid frequency and maintaining the SOC of battery 306 within a predetermined desirable range.

An exemplary controller which can be used as controller 314 and exemplary processes which may be performed by controller 314 to generate the PV power setpoint $u_{PV}$ and the battery power setpoint $u_{bat}$ are described in detail in U.S. patent application Ser. No. 15/247,869 filed Aug. 25, 2016, U.S. patent application Ser. No. 15/247,844 filed Aug. 25, 2016, U.S. patent application Ser. No. 15/247,788 filed Aug. 25, 2016, U.S. patent application Ser. No. 15/247,872 filed Aug. 25, 2016, U.S. patent application Ser. No. 15/247,880 filed Aug. 25, 2016, and U.S. patent application Ser. No. 15/247,873 filed Aug. 25, 2016. The entire disclosure of each of these patent applications is incorporated by reference herein.

Energy Storage System with Thermal and Electrical Energy Storage

Figure 5:
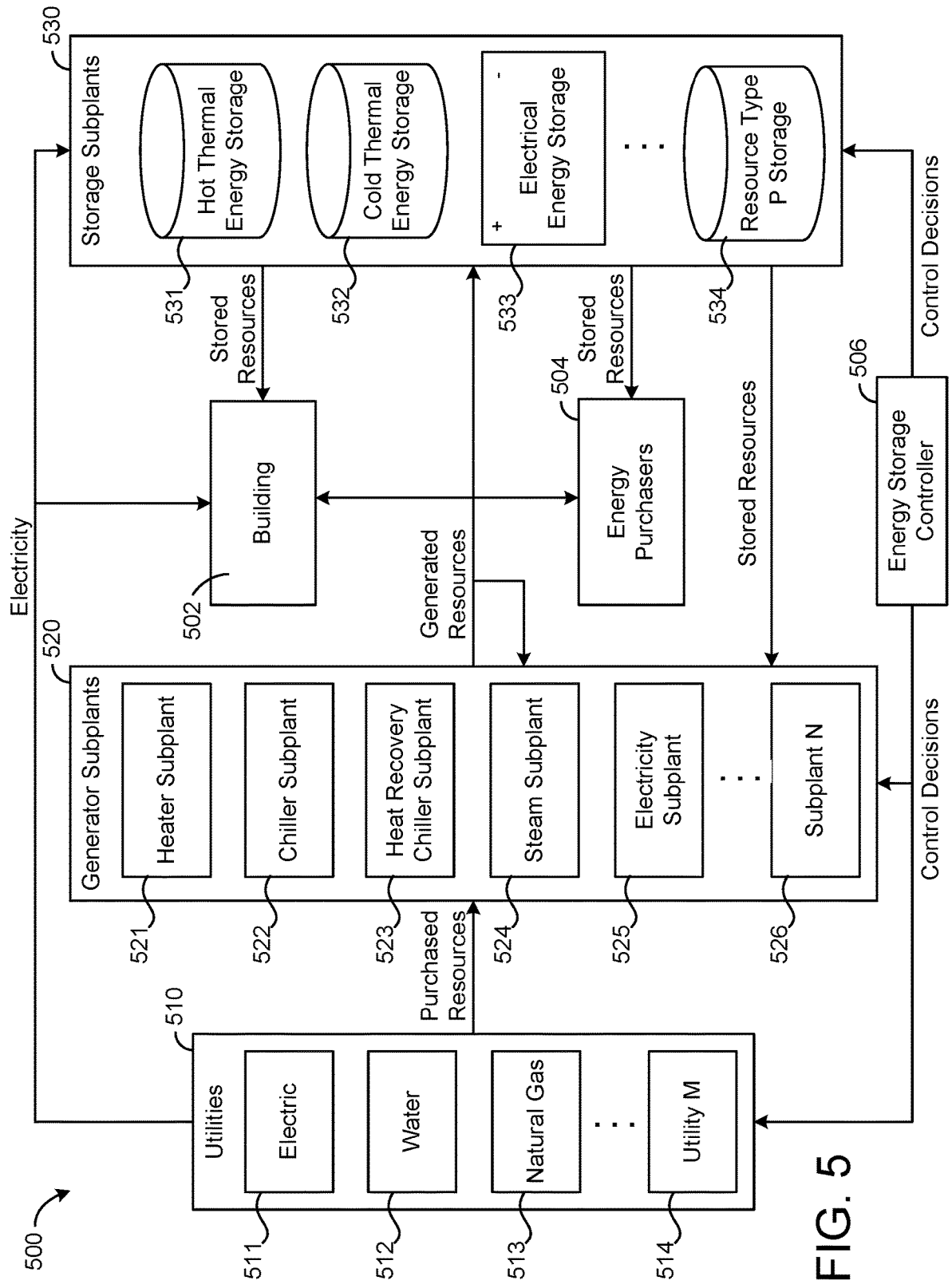
FIG. 5 is a block diagram of an energy storage system including thermal energy storage and electrical energy storage, according to an exemplary embodiment.

Referring now to FIG. 5, a block diagram of an energy storage system 500 is shown, according to an exemplary embodiment. Energy storage system 500 is shown to include a building 502. Building 502 may be the same or similar to buildings 116, as described with reference to FIG. 1. For example, building 502 may be equipped with a HVAC system and/or a building management system that operates to control conditions within building 502. In some embodiments, building 502 includes multiple buildings (i.e., a campus) served by energy storage system 500. Building 502 may demand various resources including, for example, hot thermal energy (e.g., hot water), cold thermal energy (e.g., cold water), and/or electrical energy. The resources may be demanded by equipment or subsystems within building 502 or by external systems that provide services for building 502 (e.g., heating, cooling, air circulation, lighting, electricity, etc.). Energy storage system 500 operates to satisfy the resource demand associated with building 502.

Energy storage system 500 is shown to include a plurality of utilities 510. Utilities 510 may provide energy storage system 500 with resources such as electricity, water, natural gas, or any other resource that can be used by energy storage system 500 to satisfy the demand of building 502. For example, utilities 510 are shown to include an electric utility 511, a water utility 512, a natural gas utility 513, and utility M 514, where M is the total number of utilities 510. In some embodiments, utilities 510 are commodity suppliers from which resources and other types of commodities can be purchased. Resources purchased from utilities 510 can be used by generator subplants 520 to produce generated resources (e.g., hot water, cold water, electricity, steam, etc.), stored in storage subplants 530 for later use, or provided directly to building 502. For example, utilities 510 are shown providing electricity directly to building 502 and storage subplants 530.

Energy storage system 500 is shown to include a plurality of generator subplants 520. In some embodiments, generator subplants 520 are components of a central plant (e.g., central plant 118). Generator subplants 520 are shown to include a heater subplant 521, a chiller subplant 522, a heat recovery chiller subplant 523, a steam subplant 524, an electricity subplant 525, and subplant N, where N is the total number of generator subplants 520. Generator subplants 520 may be configured to convert one or more input resources into one or more output resources by operation of the equipment within generator subplants 520. For example, heater subplant 521 may be configured to generate hot thermal energy (e.g., hot water) by heating water using electricity or natural gas. Chiller subplant 522 may be configured to generate cold thermal energy (e.g., cold water) by chilling water using electricity. Heat recovery chiller subplant 523 may be configured to generate hot thermal energy and cold thermal energy by removing heat from one water supply and adding the heat to another water supply. Steam subplant 524 may be configured to generate steam by boiling water using electricity or natural gas. Electricity subplant 525 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by generator subplants 520 may be provided by utilities 510, retrieved from storage subplants 530, and/or generated by other generator subplants 520. For example, steam subplant 524 may produce steam as an output resource. Electricity subplant 525 may include a steam turbine that uses the steam generated by steam subplant 524 as an input resource to generate electricity. The output resources produced by generator subplants 520 may be stored in storage subplants 530, provided to building 502, sold to energy purchasers 504, and/or used by other generator subplants 520. For example, the electricity generated by electricity subplant 525 may be stored in electrical energy storage 533, used by chiller subplant 522 to generate cold thermal energy, provided to building 502, and/or sold to energy purchasers 504.

Energy storage system 500 is shown to include storage subplants 530. In some embodiments, storage subplants 530 are components of a central plant (e.g., central plant 118). Storage subplants 530 may be configured to store energy and other types of resources for later use. Each of storage subplants 530 may be configured to store a different type of resource. For example, storage subplants 530 are shown to include hot thermal energy storage 531 (e.g., one or more hot water storage tanks), cold thermal energy storage 532 (e.g., one or more cold thermal energy storage tanks), electrical energy storage 533 (e.g., one or more batteries), and resource type P storage 534, where P is the total number of storage subplants 530. The resources stored in subplants 530 may be purchased directly from utilities 510 or generated by generator subplants 520.

In some embodiments, storage subplants 530 are used by energy storage system 500 to take advantage of price-based demand response (PBDR) programs. PBDR programs encourage consumers to reduce consumption when generation, transmission, and distribution costs are high. PBDR programs are typically implemented (e.g., by utilities 510) in the form of energy prices that vary as a function of time. For example, utilities 510 may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in subplants 530 allows for the resources to be purchased at times when the resources are relatively less expensive (e.g., during non-peak electricity hours) and stored for use at times when the resources are relatively more expensive (e.g., during peak electricity hours). Storing resources in subplants 530 also allows the resource demand of building 502 to be shifted in time. For example, resources can be purchased from utilities 510 at times when the demand for heating or cooling is low and immediately converted into hot or cold thermal energy by generator subplants 520. The thermal energy can be stored in storage subplants 530 and retrieved at times when the demand for heating or cooling is high. This allows energy storage system 500 to smooth the resource demand of building 502 and reduces the maximum required capacity of generator subplants 520. Smoothing the demand also allows energy storage system 500 to reduce the peak electricity consumption, which results in a lower demand charge.

In some embodiments, storage subplants 530 are used by energy storage system 500 to take advantage of incentive-based demand response (IBDR) programs. IBDR programs provide incentives to customers who have the capability to store energy, generate energy, or curtail energy usage upon request. Incentives are typically provided in the form of monetary revenue paid by utilities 510 or by an independent system operator (ISO). IBDR programs supplement traditional utility-owned generation, transmission, and distribution assets with additional options for modifying demand load curves. For example, stored energy can be sold to energy purchasers 504 (e.g., an energy grid) to supplement the energy generated by utilities 510. In some instances, incentives for participating in an IBDR program vary based on how quickly a system can respond to a request to change power output/consumption. Faster responses may be compensated at a higher level. Advantageously, electrical energy storage 533 allows system 500 to quickly respond to a request for electric power by rapidly discharging stored electrical energy to energy purchasers 504.

Still referring to FIG. 5, energy storage system 500 is shown to include an energy storage controller 506. Energy storage controller 506 may be configured to control the distribution, production, storage, and usage of resources in energy storage system 500. In some embodiments, energy storage controller 506 performs an optimization process determine an optimal set of control decisions for each time step within an optimization period. The control decisions may include, for example, an optimal amount of each resource to purchase from utilities 510, an optimal amount of each resource to produce or convert using generator subplants 520, an optimal amount of each resource to store or remove from storage subplants 530, an optimal amount of each resource to sell to energy purchasers 504, and/or an optimal amount of each resource to provide to building 502. In some embodiments, the control decisions include an optimal amount of each input resource and output resource for each of generator subplants 520.

Controller 506 may be configured to maximize the economic value of operating energy storage system 500 over the duration of the optimization period. The economic value may be defined by a value function that expresses economic value as a function of the control decisions made by controller 506. The value function may account for the cost of resources purchased from utilities 510, revenue generated by selling resources to energy purchasers 504, and the cost of operating energy storage system 500. In some embodiments, the cost of operating energy storage system 500 includes a cost for losses in battery capacity as a result of the charging and discharging electrical energy storage 533. The cost of operating energy storage system 500 may also include a cost of excessive equipment start/stops during the optimization period.

Each of subplants 520-530 may include equipment that can be controlled by energy storage controller 506 to optimize the performance of energy storage system 500. Subplant equipment may include, for example, heating devices, chillers, heat recovery heat exchangers, cooling towers, energy storage devices, pumps, valves, and/or other devices of subplants 520-530. Individual devices of generator subplants 520 can be turned on or off to adjust the resource production of each generator subplant. In some embodiments, individual devices of generator subplants 520 can be operated at variable capacities (e.g., operating a chiller at 10% capacity or 60% capacity) according to an operating setpoint received from energy storage controller 506.

In some embodiments, one or more of subplants 520-530 includes a subplant level controller configured to control the equipment of the corresponding subplant. For example, energy storage controller 506 may determine an on/off configuration and global operating setpoints for the subplant equipment. In response to the on/off configuration and received global operating setpoints, the subplant controllers may turn individual devices of their respective equipment on or off, and implement specific operating setpoints (e.g., damper position, vane position, fan speed, pump speed, etc.) to reach or maintain the global operating setpoints.

In some embodiments, controller 506 maximizes the life cycle economic value of energy storage system 500 while participating in PBDR programs, IBDR programs, or simultaneously in both PBDR and IBDR programs. For the IBDR programs, controller 506 may use statistical estimates of past clearing prices, mileage ratios, and event probabilities to determine the revenue generation potential of selling stored energy to energy purchasers 504. For the PBDR programs, controller 506 may use predictions of ambient conditions, facility thermal loads, and thermodynamic models of installed equipment to estimate the resource consumption of subplants 520. Controller 506 may use predictions of the resource consumption to monetize the costs of running the equipment.

Controller 506 may automatically determine (e.g., without human intervention) a combination of PBDR and/or IBDR programs in which to participate over the optimization period in order to maximize economic value. For example, controller 506 may consider the revenue generation potential of IBDR programs, the cost reduction potential of PBDR programs, and the equipment maintenance/replacement costs that would result from participating in various combinations of the IBDR programs and PBDR programs. Controller 506 may weigh the benefits of participation against the costs of participation to determine an optimal combination of programs in which to participate. Advantageously, this allows controller 506 to determine an optimal set of control decisions that maximize the overall value of operating energy storage system 500.

In some instances, controller 506 may determine that it would be beneficial to participate in an IBDR program when the revenue generation potential is high and/or the costs of participating are low. For example, controller 506 may receive notice of a synchronous reserve event from an IBDR program which requires energy storage system 500 to shed a predetermined amount of power. Controller 506 may determine that it is optimal to participate in the IBDR program if cold thermal energy storage 532 has enough capacity to provide cooling for building 502 while the load on chiller subplant 522 is reduced in order to shed the predetermined amount of power.

In other instances, controller 506 may determine that it would not be beneficial to participate in an IBDR program when the resources required to participate are better allocated elsewhere. For example, if building 502 is close to setting a new peak demand that would greatly increase the PBDR costs, controller 506 may determine that only a small portion of the electrical energy stored in electrical energy storage 533 will be sold to energy purchasers 504 in order to participate in a frequency response market. Controller 506 may determine that the remainder of the electrical energy will be used to power chiller subplant 522 to prevent a new peak demand from being set.

In some embodiments, energy storage system 500 and controller include some or all of the components and/or features described in U.S. patent application Ser. No. 15/247,875 filed Aug. 25, 2016, U.S. patent application Ser. No. 15/247,879 filed Aug. 25, 2016, and U.S. patent application Ser. No. 15/247,881 filed Aug. 25, 2016. The entire disclosure of each of these patent applications is incorporated by reference herein.

Energy Storage Controller

Figure 6:
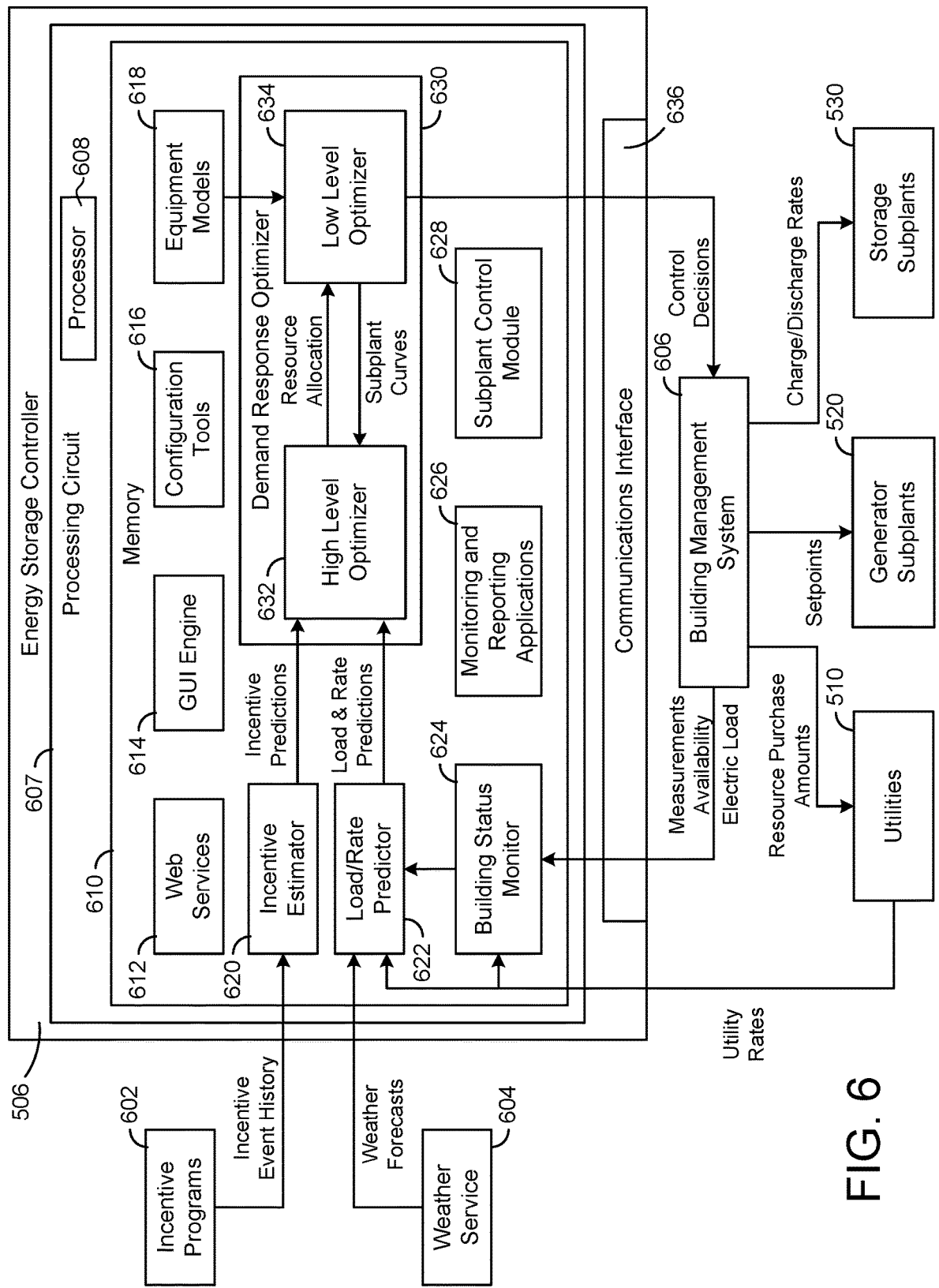
FIG. 6 is block diagram of an energy storage controller which may be used to operate the energy storage system of FIG. 5, according to an exemplary embodiment.

Referring now to FIG. 6, a block diagram illustrating energy storage controller 506 in greater detail is shown, according to an exemplary embodiment. Energy storage controller 506 is shown providing control decisions to a building management system (BMS) 606. In some embodiments, BMS 606 is the same or similar the BMS described with reference to FIG. 1. The control decisions provided to BMS 606 may include resource purchase amounts for utilities 510, setpoints for generator subplants 520, and/or charge/discharge rates for storage subplants 530.

BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to energy storage controller 506. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate subplants 520-530 to affect the monitored conditions within the building and to serve the thermal energy loads of the building.

BMS 606 may receive control signals from energy storage controller 506 specifying on/off states, charge/discharge rates, and/or setpoints for the subplant equipment. BMS 606 may control the equipment (e.g., via actuators, power relays, etc.) in accordance with the control signals provided by energy storage controller 506. For example, BMS 606 may operate the equipment using closed loop control to achieve the setpoints specified by energy storage controller 506. In various embodiments, BMS 606 may be combined with energy storage controller 506 or may be part of a separate building management system. According to an exemplary embodiment, BMS 606 is a METASYS® brand building management system, as sold by Johnson Controls, Inc.

Energy storage controller 506 may monitor the status of the controlled building using information received from BMS 606. Energy storage controller 506 may be configured to predict the thermal energy loads (e.g., heating loads, cooling loads, etc.) of the building for plurality of time steps in an optimization period (e.g., using weather forecasts from a weather service 604). Energy storage controller 506 may also predict the revenue generation potential of IBDR programs using an incentive event history (e.g., past clearing prices, mileage ratios, event probabilities, etc.) from incentive programs 602. Energy storage controller 506 may generate control decisions that optimize the economic value of operating energy storage system 500 over the duration of the optimization period subject to constraints on the optimization process (e.g., energy balance constraints, load satisfaction constraints, etc.). The optimization process performed by energy storage controller 506 is described in greater detail below.

According to an exemplary embodiment, energy storage controller 506 is integrated within a single computer (e.g., one server, one housing, etc.). In various other exemplary embodiments, energy storage controller 506 can be distributed across multiple servers or computers (e.g., that can exist in distributed locations). In another exemplary embodiment, energy storage controller 506 may integrated with a smart building manager that manages multiple building systems and/or combined with BMS 606.

Energy storage controller 506 is shown to include a communications interface 636 and a processing circuit 607. Communications interface 636 may include wired or wireless interfaces (e.g., jacks, antennas, transmitters, receivers, transceivers, wire terminals, etc.) for conducting data communications with various systems, devices, or networks. For example, communications interface 636 may include an Ethernet card and port for sending and receiving data via an Ethernet-based communications network and/or a WiFi transceiver for communicating via a wireless communications network. Communications interface 636 may be configured to communicate via local area networks or wide area networks (e.g., the Internet, a building WAN, etc.) and may use a variety of communications protocols (e.g., BACnet, IP, LON, etc.).

Communications interface 636 may be a network interface configured to facilitate electronic data communications between energy storage controller 506 and various external systems or devices (e.g., BMS 606, subplants 520-530, utilities 510, etc.). For example, energy storage controller 506 may receive information from BMS 606 indicating one or more measured states of the controlled building (e.g., temperature, humidity, electric loads, etc.) and one or more states of subplants 520-530 (e.g., equipment status, power consumption, equipment availability, etc.). Communications interface 636 may receive inputs from BMS 606 and/or subplants 520-530 and may provide operating parameters (e.g., on/off decisions, setpoints, etc.) to subplants 520-530 via BMS 606. The operating parameters may cause subplants 520-530 to activate, deactivate, or adjust a setpoint for various devices thereof.

Still referring to FIG. 6, processing circuit 607 is shown to include a processor 608 and memory 610. Processor 608 may be a general purpose or specific purpose processor, an application specific integrated circuit (ASIC), one or more field programmable gate arrays (FPGAs), a group of processing components, or other suitable processing components. Processor 608 may be configured to execute computer code or instructions stored in memory 610 or received from other computer readable media (e.g., CDROM, network storage, a remote server, etc.).

Memory 610 may include one or more devices (e.g., memory units, memory devices, storage devices, etc.) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure. Memory 610 may be communicably connected to processor 608 via processing circuit 607 and may include computer code for executing (e.g., by processor 608) one or more processes described herein.

Memory 610 is shown to include a building status monitor 624. Energy storage controller 506 may receive data regarding the overall building or building space to be heated or cooled by system 500 via building status monitor 624. In an exemplary embodiment, building status monitor 624 may include a graphical user interface component configured to provide graphical user interfaces to a user for selecting building requirements (e.g., overall temperature parameters, selecting schedules for the building, selecting different temperature levels for different building zones, etc.).

Energy storage controller 506 may determine on/off configurations and operating setpoints to satisfy the building requirements received from building status monitor 624. In some embodiments, building status monitor 624 receives, collects, stores, and/or transmits cooling load requirements, building temperature setpoints, occupancy data, weather data, energy data, schedule data, and other building parameters. In some embodiments, building status monitor 624 stores data regarding energy costs, such as pricing information available from utilities 510 (energy charge, demand charge, etc.).

Still referring to FIG. 6, memory 610 is shown to include a load/rate predictor 622. Load/rate predictor 622 may be configured to predict the thermal energy loads ($\hat{\ell}_k$) of the building or campus for each time step k (e.g., k=1 . . . n) of an optimization period. Load/rate predictor 622 is shown receiving weather forecasts from a weather service 604. In some embodiments, load/rate predictor 622 predicts the thermal energy loads $\hat{\ell}_k$ as a function of the weather forecasts. In some embodiments, load/rate predictor 622 uses feedback from BMS 606 to predict loads $\hat{\ell}_k$. Feedback from BMS 606 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 622 receives a measured electric load and/or previous measured load data from BMS 606 (e.g., via building status monitor 624). Load/rate predictor 622 may predict loads $\hat{\ell}_k$ as a function of a given weather forecast ($\hat{\phi}_w$) a day type (day), the time of day (t), and previous measured load data ($Y_{k-1}$). Such a relationship is expressed in the following equation:

$$\hat{\ell}_k = f(\hat{\phi}_w, \text{day}, t | Y_{k-1})$$

In some embodiments, load/rate predictor 622 uses a deterministic plus stochastic model trained from historical load data to predict loads $\hat{\ell}_k$. Load/rate predictor 622 may use any of a variety of prediction methods to predict loads $\hat{\ell}_k$ (e.g., linear regression for the deterministic portion and an AR model for the stochastic portion). Load/rate predictor 622 may predict one or more different types of loads for the building or campus. For example, load/rate predictor 622 may predict a hot water load $\hat{\ell}_{Hot,k}$ and a cold water load $\hat{\ell}_{Cold,k}$ for each time step k within the prediction window. In some embodiments, load/rate predictor 622 makes load/rate predictions using the techniques described in U.S. patent application Ser. No. 14/717,593.

Load/rate predictor 622 is shown receiving utility rates from utilities 510. Utility rates may indicate a cost or price per unit of a resource (e.g., electricity, natural gas, water, etc.) provided by utilities 510 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 510 or predicted utility rates estimated by load/rate predictor 622.

In some embodiments, the utility rates include demand charges for one or more resources provided by utilities 510. A demand charge may define a separate cost imposed by utilities 510 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, demand response optimizer 630 may be configured to account for demand charges in the high level optimization process performed by high level optimizer 632. Utilities 510 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 622 may store the predicted loads $\hat{\ell}_k$ and the utility rates in memory 610 and/or provide the predicted loads $\hat{\ell}_k$ and the utility rates to demand response optimizer 630.

Still referring to FIG. 6, memory 610 is shown to include an incentive estimator 620. Incentive estimator 620 may be configured to estimate the revenue generation potential of participating in various incentive-based demand response (IBDR) programs. In some embodiments, incentive estimator 620 receives an incentive event history from incentive programs 602. The incentive event history may include a history of past IBDR events from incentive programs 602. An IBDR event may include an invitation from incentive programs 602 to participate in an IBDR program in exchange for a monetary incentive. The incentive event history may indicate the times at which the past IBDR events occurred and attributes describing the IBDR events (e.g., clearing prices, mileage ratios, participation requirements, etc.). Incentive estimator 620 may use the incentive event history to estimate IBDR event probabilities during the optimization period.

Incentive estimator 620 is shown providing incentive predictions to demand response optimizer 630. The incentive predictions may include the estimated IBDR probabilities, estimated participation requirements, an estimated amount of revenue from participating in the estimated IBDR events, and/or any other attributes of the predicted IBDR events. Demand response optimizer 630 may use the incentive predictions along with the predicted loads $\hat{\ell}_k$ and utility rates from load/rate predictor 622 to determine an optimal set of control decisions for each time step within the optimization period.

Still referring to FIG. 6, memory 610 is shown to include a demand response optimizer 630. Demand response optimizer 630 may perform a cascaded optimization process to optimize the performance of energy storage system 500. For example, demand response optimizer 630 is shown to include a high level optimizer 632 and a low level optimizer 634. High level optimizer 632 may control an outer (e.g., subplant level) loop of the cascaded optimization. High level optimizer 632 may determine an optimal set of control decisions for each time step in the prediction window in order to optimize (e.g., maximize) the value of operating energy storage system 500. Control decisions made by high level optimizer 632 may include, for example, load setpoints for each of generator subplants 520, charge/discharge rates for each of storage subplants 530, resource purchase amounts for each type of resource purchased from utilities 510, and/or an amount of each resource sold to energy purchasers 504. In other words, the control decisions may define resource allocation at each time step. The control decisions made by high level optimizer 632 are based on the statistical estimates of incentive event probabilities and revenue generation potential for various IBDR events as well as the load and rate predictions.

Low level optimizer 634 may control an inner (e.g., equipment level) loop of the cascaded optimization. Low level optimizer 634 may determine how to best run each subplant at the load setpoint determined by high level optimizer 632. For example, low level optimizer 634 may determine on/off states and/or operating setpoints for various devices of the subplant equipment in order to optimize (e.g., minimize) the energy consumption of each subplant while meeting the resource allocation setpoint for the subplant. In some embodiments, low level optimizer 634 receives actual incentive events from incentive programs 602. Low level optimizer 634 may determine whether to participate in the incentive events based on the resource allocation set by high level optimizer 632. For example, if insufficient resources have been allocated to a particular IBDR program by high level optimizer 632 or if the allocated resources have already been used, low level optimizer 634 may determine that energy storage system 500 will not participate in the IBDR program and may ignore the IBDR event. However, if the required resources have been allocated to the IBDR program and are available in storage subplants 530, low level optimizer 634 may determine that system 500 will participate in the IBDR program in response to the IBDR event. The cascaded optimization process performed by demand response optimizer 630 is described in greater detail in U.S. patent application Ser. No. 15/247,885.

Still referring to FIG. 6, memory 610 is shown to include a subplant control module 628. Subplant control module 628 may store historical data regarding past operating statuses, past operating setpoints, and instructions for calculating and/or implementing control parameters for subplants 520-530. Subplant control module 628 may also receive, store, and/or transmit data regarding the conditions of individual devices of the subplant equipment, such as operating efficiency, equipment degradation, a date since last service, a lifespan parameter, a condition grade, or other device-specific data. Subplant control module 628 may receive data from subplants 520-530 and/or BMS 606 via communications interface 636. Subplant control module 628 may also receive and store on/off statuses and operating setpoints from low level optimizer 634.

Data and processing results from demand response optimizer 630, subplant control module 628, or other modules of energy storage controller 506 may be accessed by (or pushed to) monitoring and reporting applications 626. Monitoring and reporting applications 626 may be configured to generate real time "system health" dashboards that can be viewed and navigated by a user (e.g., a system engineer). For example, monitoring and reporting applications 626 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across energy storage systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the energy storage system.

Still referring to FIG. 6, energy storage controller 506 may include one or more GUI servers, web services 612, or GUI engines 614 to support monitoring and reporting applications 626. In various embodiments, applications 626, web services 612, and GUI engine 614 may be provided as separate components outside of energy storage controller 506 (e.g., as part of a smart building manager). Energy storage controller 506 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Energy storage controller 506 may be configured to provide the results of any such processing to other databases, tables, XML files, or other data structures for further querying, calculation, or access by, for example, external monitoring and reporting applications.

Energy storage controller 506 is shown to include configuration tools 616. Configuration tools 616 can allow a user to define (e.g., via graphical user interfaces, via prompt-driven "wizards," etc.) how energy storage controller 506 should react to changing conditions in the energy storage subsystems. In an exemplary embodiment, configuration tools 616 allow a user to build and store condition-response scenarios that can cross multiple energy storage system devices, multiple building systems, and multiple enterprise control applications (e.g., work order management system applications, entity resource planning applications, etc.). For example, configuration tools 616 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 616 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Planning Tool

Figure 7:
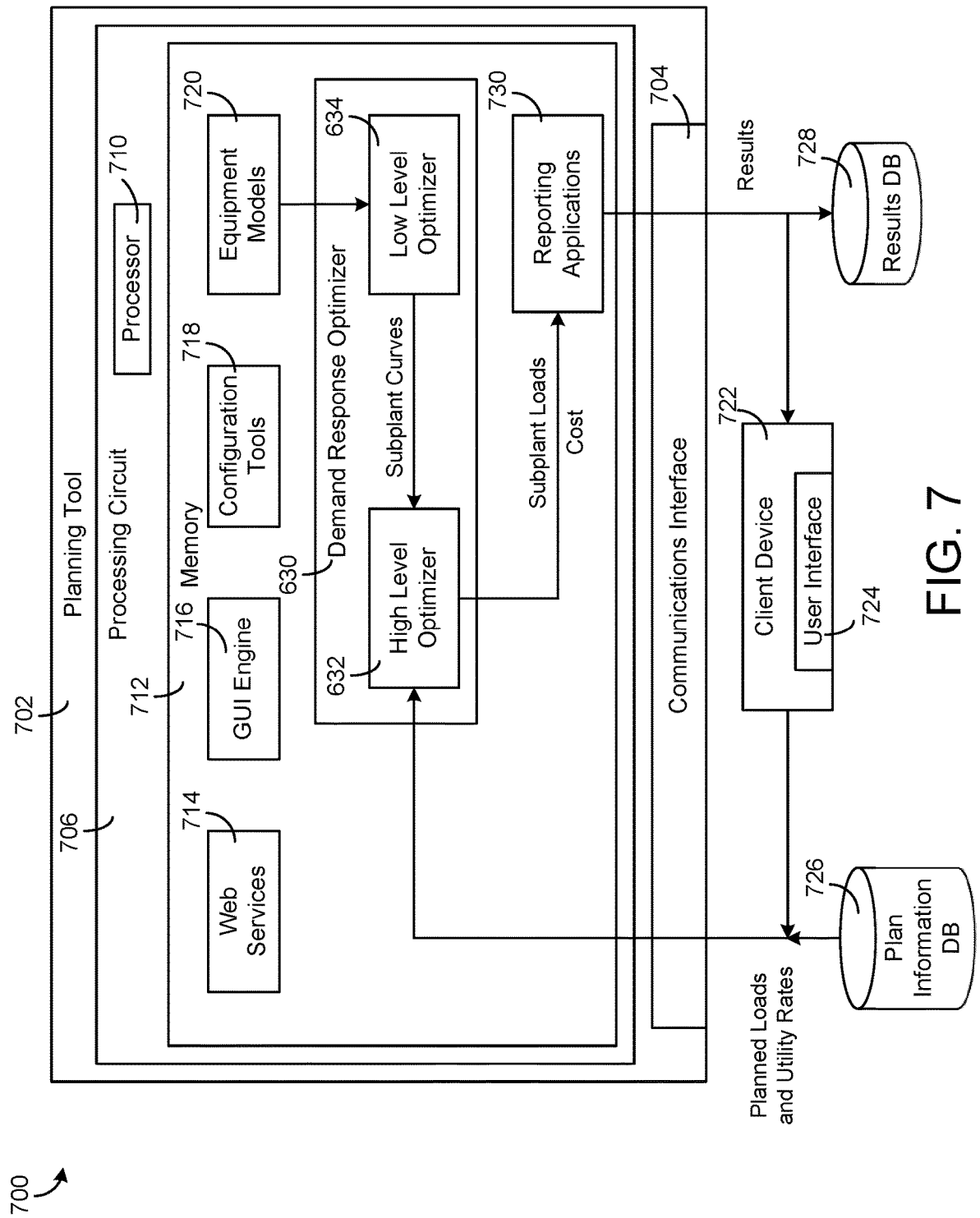
FIG. 7 is a block diagram of a planning tool which can be used to determine the benefits of investing in a battery asset and calculate various financial metrics associated with the investment, according to an exemplary embodiment.

Referring now to FIG. 7, a block diagram of a planning system 700 is shown, according to an exemplary embodiment. Planning system 700 may be configured to use demand response optimizer 630 as part of a planning tool 702 to simulate the operation of a central plant over a predetermined time period (e.g., a day, a month, a week, a year, etc.) for planning, budgeting, and/or design considerations. When implemented in planning tool 702, demand response optimizer 630 may operate in a similar manner as described with reference to FIG. 6. For example, demand response optimizer 630 may use building loads and utility rates to determine an optimal resource allocation to minimize cost over a simulation period. However, planning tool 702 may not be responsible for real-time control of a building management system or central plant.

Planning tool 702 can be configured to determine the benefits of investing in a battery asset and the financial metrics associated with the investment. Such financial metrics can include, for example, the internal rate of return (IRR), net present value (NPV), and/or simple payback period (SPP). Planning tool 702 can also assist a user in determining the size of the battery which yields optimal financial metrics such as maximum NPV or a minimum SPP. In some embodiments, planning tool 702 allows a user to specify a battery size and automatically determines the benefits of the battery asset from participating in selected IBDR programs while performing PBDR, as described with reference to FIG. 5. In some embodiments, planning tool 702 is configured to determine the battery size that minimizes SPP given the IBDR programs selected and the requirement of performing PBDR. In some embodiments, planning tool 702 is configured to determine the battery size that maximizes NPV given the IBDR programs selected and the requirement of performing PBDR.

In planning tool 702, high level optimizer 632 may receive planned loads and utility rates for the entire simulation period. The planned loads and utility rates may be defined by input received from a user via a client device 722 (e.g., user-defined, user selected, etc.) and/or retrieved from a plan information database 726. High level optimizer 632 uses the planned loads and utility rates in conjunction with subplant curves from low level optimizer 634 to determine an optimal resource allocation (i.e., an optimal dispatch schedule) for a portion of the simulation period.

The portion of the simulation period over which high level optimizer 632 optimizes the resource allocation may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, high level optimizer 632 requests all of the subplant curves used in the simulation from low level optimizer 634 at the beginning of the simulation. Since the planned loads and environmental conditions are known for the entire simulation period, high level optimizer 632 may retrieve all of the relevant subplant curves at the beginning of the simulation. In some embodiments, low level optimizer 634 generates functions that map subplant production to equipment level production and resource use when the subplant curves are provided to high level optimizer 632. These subplant to equipment functions may be used to calculate the individual equipment production and resource use (e.g., in a post-processing module) based on the results of the simulation.

Still referring to FIG. 7, planning tool 702 is shown to include a communications interface 704 and a processing circuit 706. Communications interface 704 may include wired or wireless interfaces (e.g., jacks, antennas, transmitters, receivers, transceivers, wire terminals, etc.) for conducting data communications with various systems, devices, or networks. For example, communications interface 704 may include an Ethernet card and port for sending and receiving data via an Ethernet-based communications network and/or a WiFi transceiver for communicating via a wireless communications network. Communications interface 704 may be configured to communicate via local area networks or wide area networks (e.g., the Internet, a building WAN, etc.) and may use a variety of communications protocols (e.g., BACnet, IP, LON, etc.).

Communications interface 704 may be a network interface configured to facilitate electronic data communications between planning tool 702 and various external systems or devices (e.g., client device 722, results database 728, plan information database 726, etc.). For example, planning tool 702 may receive planned loads and utility rates from client device 722 and/or plan information database 726 via communications interface 704. Planning tool 702 may use communications interface 704 to output results of the simulation to client device 722 and/or to store the results in results database 728.

Still referring to FIG. 7, processing circuit 706 is shown to include a processor 710 and memory 712. Processor 710 may be a general purpose or specific purpose processor, an application specific integrated circuit (ASIC), one or more field programmable gate arrays (FPGAs), a group of processing components, or other suitable processing components. Processor 710 may be configured to execute computer code or instructions stored in memory 712 or received from other computer readable media (e.g., CDROM, network storage, a remote server, etc.).

Memory 712 may include one or more devices (e.g., memory units, memory devices, storage devices, etc.) for storing data and/or computer code for completing and/or facilitating the various processes described in the present disclosure. Memory 712 may include random access memory (RAM), read-only memory (ROM), hard drive storage, temporary storage, non-volatile memory, flash memory, optical memory, or any other suitable memory for storing software objects and/or computer instructions. Memory 712 may include database components, object code components, script components, or any other type of information structure for supporting the various activities and information structures described in the present disclosure. Memory 712 may be communicably connected to processor 710 via processing circuit 706 and may include computer code for executing (e.g., by processor 710) one or more processes described herein.

Still referring to FIG. 7, memory 712 is shown to include a GUI engine 716, web services 714, and configuration tools 718. In an exemplary embodiment, GUI engine 716 includes a graphical user interface component configured to provide graphical user interfaces to a user for selecting or defining plan information for the simulation (e.g., planned loads, utility rates, environmental conditions, etc.). Web services 714 may allow a user to interact with planning tool 702 via a web portal and/or from a remote system or device (e.g., an enterprise control application).

Configuration tools 718 can allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. Configuration tools 718 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 726) and adapt it or enable it for use in the simulation.

Still referring to FIG. 7, memory 712 is shown to include demand response optimizer 630. Demand response optimizer 630 may use the planned loads and utility rates to determine an optimal resource allocation over a prediction window. The operation of demand response optimizer 630 may be the same or similar as previously described with reference to FIGS. 6-8. With each iteration of the optimization process, demand response optimizer 630 may shift the prediction window forward and apply the optimal resource allocation for the portion of the simulation period no longer in the prediction window. Demand response optimizer 630 may use the new plan information at the end of the prediction window to perform the next iteration of the optimization process. Demand response optimizer 630 may output the applied resource allocation to reporting applications 730 for presentation to a client device 722 (e.g., via user interface 724) or storage in results database 728.

Still referring to FIG. 7, memory 712 is shown to include reporting applications 730. Reporting applications 730 may receive the optimized resource allocations from demand response optimizer 630 and, in some embodiments, costs associated with the optimized resource allocations. Reporting applications 730 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize resource allocation and the costs associated therewith and provide the results to a user via a GUI. The GUI elements may include charts or histograms that allow the user to visually analyze the results of the simulation. An exemplary output that may be generated by reporting applications 730 is shown in FIG. 8.

Figure 8:
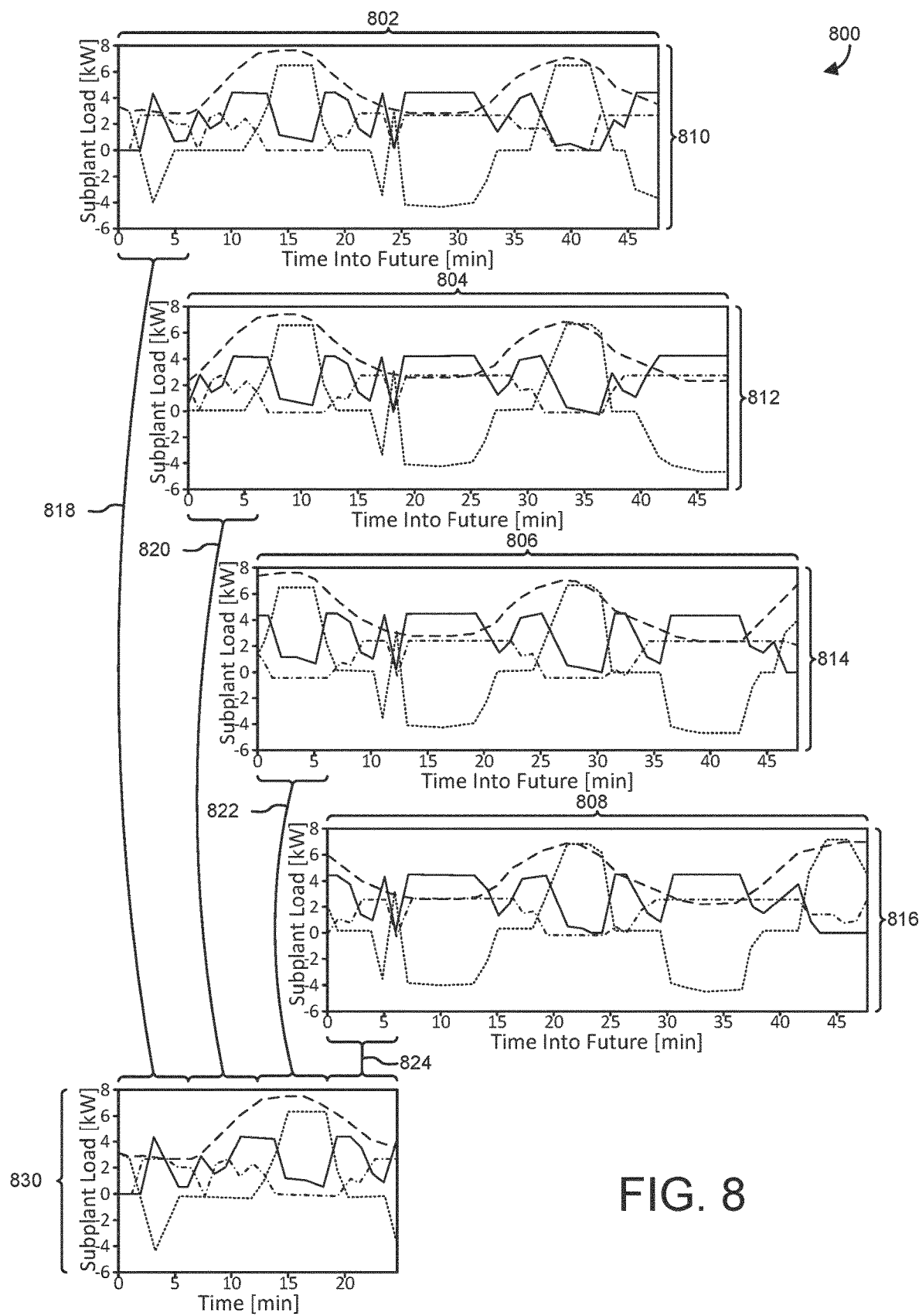
FIG. 8 is a drawing illustrating the operation of the planning tool of FIG. 7, according to an exemplary embodiment.

Referring now to FIG. 8, several graphs 800 illustrating the operation of planning tool 702 are shown, according to an exemplary embodiment. With each iteration of the optimization process, planning tool 702 selects an optimization period (i.e., a portion of the simulation period) over which the optimization is performed. For example, planning tool 702 may select optimization period 802 for use in the first iteration. Once the optimal resource allocation 810 has been determined, planning tool 702 may select a portion 818 of resource allocation 810 to send to plant dispatch 830. Portion 818 may be the first b time steps of resource allocation 810. Planning tool 702 may shift the optimization period 802 forward in time, resulting in optimization period 804. The amount by which the prediction window is shifted may correspond to the duration of time steps b.

Planning tool 702 may repeat the optimization process for optimization period 804 to determine the optimal resource allocation 812. Planning tool 702 may select a portion 820 of resource allocation 812 to send to plant dispatch 830. Portion 820 may be the first b time steps of resource allocation 812. Planning tool 702 may then shift the prediction window forward in time, resulting in optimization period 806. This process may be repeated for each subsequent optimization period (e.g., optimization periods 806, 808, etc.) to generate updated resource allocations (e.g., resource allocations 814, 816, etc.) and to select portions of each resource allocation (e.g., portions 822, 824) to send to plant dispatch 830. Plant dispatch 830 includes the first b time steps 818-824 from each of optimization periods 802-808. Once the optimal resource allocation is compiled for the entire simulation period, the results may be sent to reporting applications 730, results database 728, and/or client device 722, as described with reference to FIG. 7.

Block-and-Index Rate Structure

Figure 9:
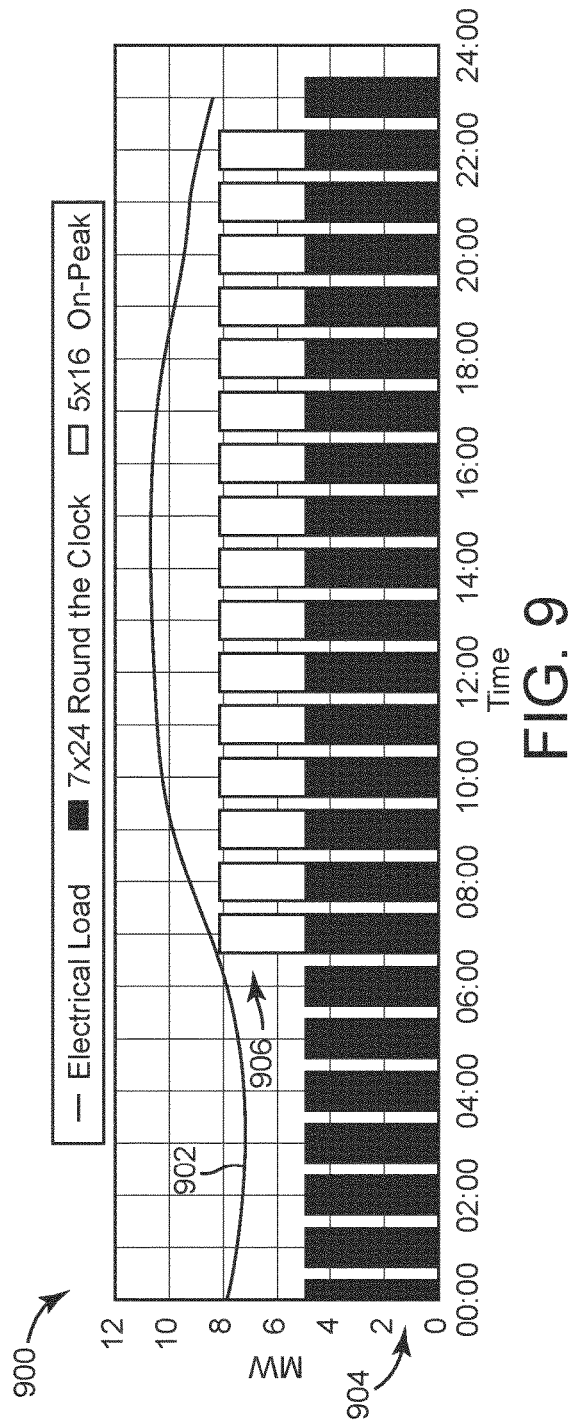
FIG. 9 is a first graphical illustration of a block-and-index rate structure, according to an exemplary embodiment.
Figure 10:
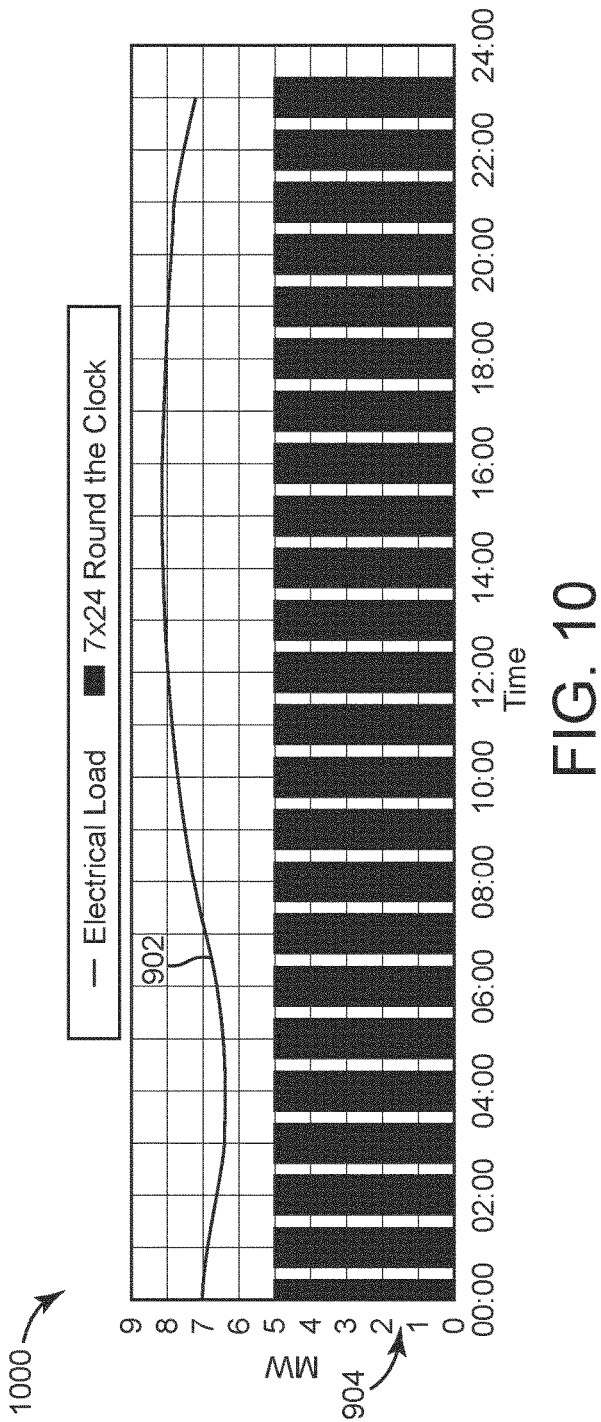
FIG. 10 is a second graphical illustration of a block-and-index rate structure, according to an exemplary embodiment.

Referring now to FIGS. 9-10, graphical representations of a block-and-index rate structure are shown, according to exemplary embodiments. Several pricing schemes (rate structures) for power (e.g., electricity) and energy (e.g., natural gas) are used by various utility providers and various customers. As described in detail below, systems and methods for cost optimization in building system and central energy facilities may be adjusted to account for various pricing schemes.

One type of rate structure is known as a block-and-index rate structure, which provides some degree of hedging and risk management for a customer by allowing the customer to purchase a "block" of energy or power at a fixed price, while paying for consumption beyond that block at the hourly market rate. FIGS. 9-10 illustrate a block-and-index rate structure. FIG. 9 shows a graph 900 of a block-and-index rate structure during a weekday, while FIG. 10 shows a graph 1000 of a block-and-index rate structure during a weekend. Graph 900 and graph 1000 both include a load line 902 that plots the electric load of a building or central energy facility (plant) over time. In the example shown, the load line 902 increases during daytime hours (e.g., during a typical workday), indicating increased electricity consumption during awake/working hours and/or during warmer hours when a cooling load for a building may be higher.

Graph 900 and graph 1000 also show a first block 904. The first block 904 represents a first pre-purchased, fixed rate block of power of a fixed size. The first block 904 illustrates that at each time step the customer purchases a constant, fixed amount of power from the utility company. Graph 900 also includes a second block 906. The second block 906 represents a second pre-purchased, fixed rate block of power at a fixed size. The second block 906 may be purchased at the same rate (price) or a different rate than the first block 904. The second block 906 is included during peak load hours and illustrates that the customer may pre-purchase more power at some times of the day and less power at other times of the day.

In the notation used herein, energy or power $e_{b,i}$ is pre-purchased in a block of size B at fixed block rate $r_b$. The difference between the load line 902 and the top of the first block 904 or the second block 906 at a time step i is the amount of energy $e_{ind,i}$ purchased at the hourly day-ahead-pricing rate $r_{DAP,i}$. The total energy or power received from the utility provider (i.e., shown by the load line 902) is denoted as $e_{import,i}$. Accordingly, $e_{import,i} = e_b + e_{ini,i}$. In some cases, the total energy received from the utility provider may be less than the block size (i.e., $e_{import,i} < B$). In some such cases, the customer may be allowed to sell back the difference (i.e., $e_{ind,i} < 0$) to the utility provider. In other such cases, the customer bears the risk of consuming less than the block size and may not sell back the difference.

The block-and-index pricing scheme illustrated by FIGS. 9-10 may be applied either to purchase of power (e.g., electricity in kilowatts) or energy (e.g., natural gas or other resource in kWh). Power may be purchased as a certain amount (i.e., a certain block size) at each time step within an optimization period (e.g., each hour in a month as represented in FIGS. 9-10). Energy may be purchased as an amount of energy for a given period (e.g., one month), in which case the total amount B is divided by the number of time steps to get a block size for each time step. The optimization approaches described in detail below proceed under these definitions.

Load-Following-Block Rate Structure

Figure 11:
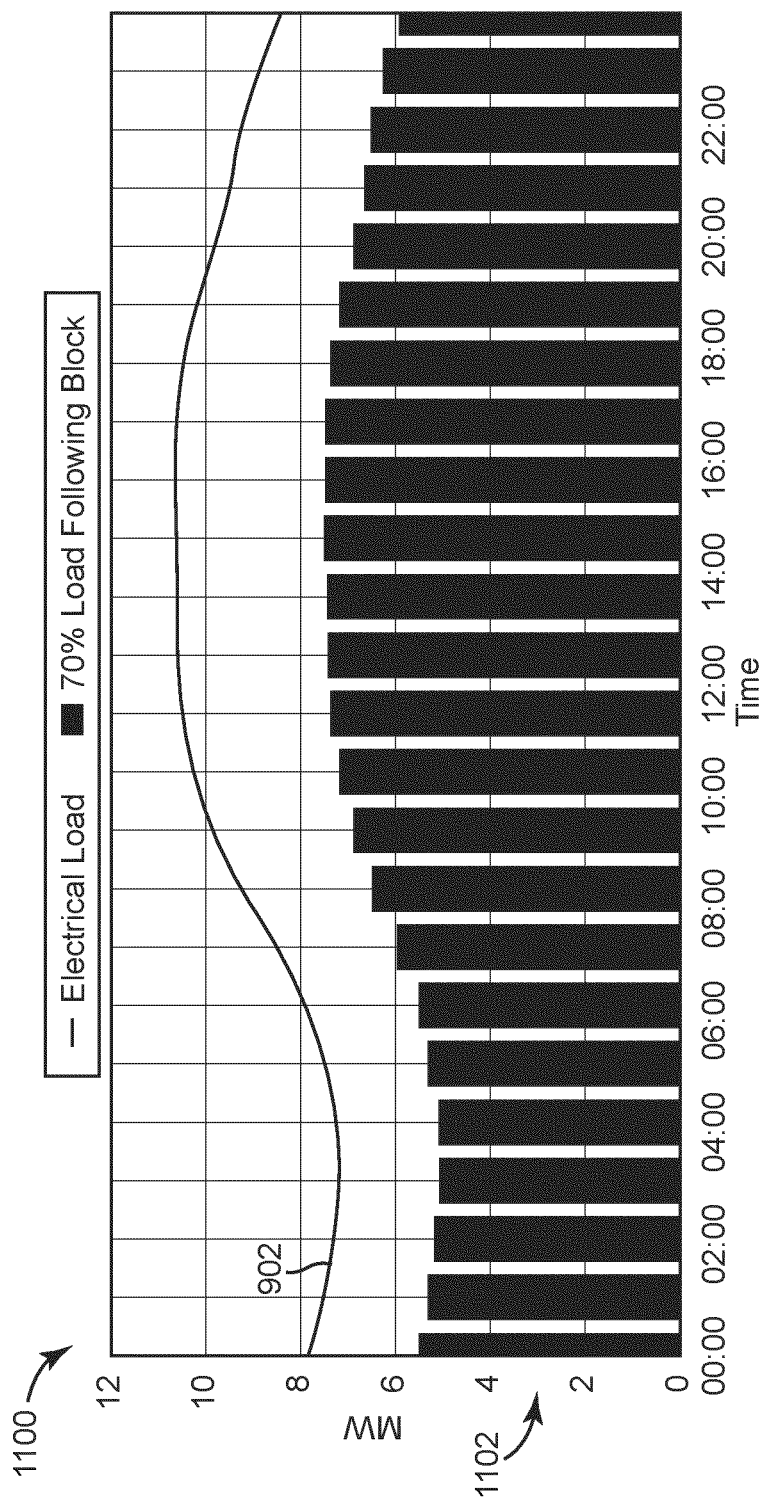
FIG. 11 is a graphical illustration of a load-following block rate structure, according to an exemplary embodiment.

Referring now to FIG. 11, a graphical representation of a load-following-block rate structure is shown, according to an exemplary embodiment. FIG. 11 shows a graph 1100. The graph 1100 includes the load line 902 that plots total power $e_{import,i}$ imported from the utility provider over time. The graph 1100 also shows a load-following block 1102 for each time step. The load-following block 1102 represents an amount of power purchased at a fixed, pre-set rate. In the load-following-block rate structure of FIG. 11, the size of the block 1102 is determined as a fixed hedging percentage $\alpha_h$ of the total imported power $e_{import,i}$, i.e., such that an amount of power $\alpha_h*e_{import,i}$ is purchased at a fixed load-following-block rate $r_{LFB}$. This allows a customer to hedge on the price of power without committing to a fixed amount of power. The remainder of the imported power (i.e., $(1-\alpha_h)*e_{import,i}$) is purchased at the hourly market rate $r_{DAP,i}$.

Cost Optimization for Block-and-Index Rate Structure

Power Block without Sell Back

Figure 12:
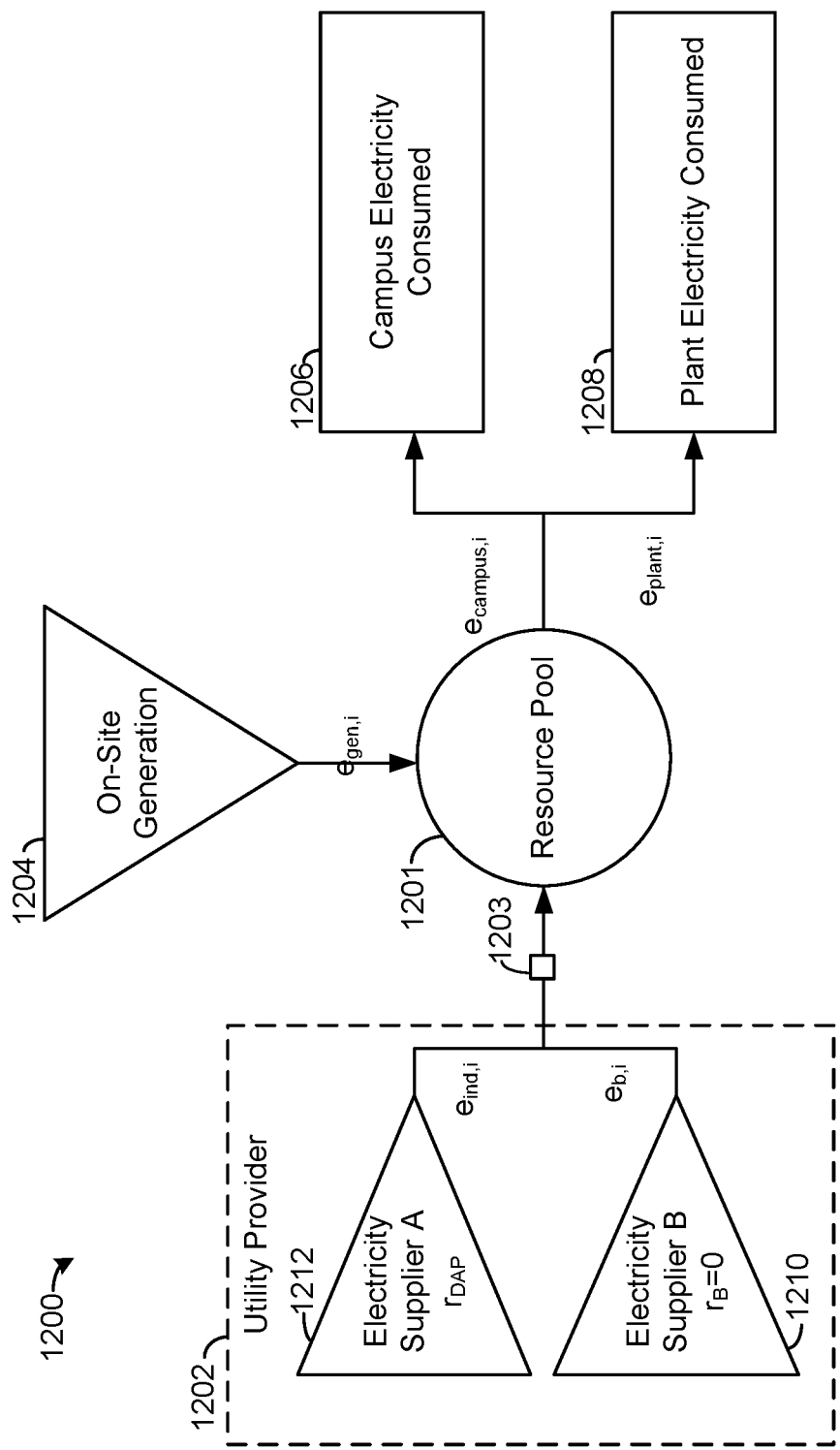
FIG. 12 is a block diagram of a building energy system under a power block-and-index rate structure, according to an exemplary embodiment.

Referring now to FIG. 12, a block diagram of a resource allocation system 1200 subject to a block-and-index rate structure is shown, according to an exemplary embodiment. In the resource allocation system 1200, electricity is provided to a resource pool 1201 by a utility provider 1202 and generated on site via on-site generation 1204. Resources are consumed at a campus 1206. Resources are also consumed at a plant 1208, for example to generate steam, chilled water, and/or various other resources fed back into the resource pool 1201 via on-site generation 1204. The utility provider 1202 provides power under a block-and-index rate structure, as described with reference to FIGS. 9-10.

The resource allocation system 1200 may therefore correspond to the energy storage system 500 in FIG. 5. In some embodiments, the energy storage controller 506 of FIGS. 5-6 is used with the resource allocation system 1200 to allocate resources and load amongst the utility provider 1202, on-site generation 1204, campus 1206, and plant 1208. In some embodiments, the planning tool 702 is used with the resource allocation system 1200 to predict energy/power costs and/or determine an optimal participation strategy in a block-and-index rate structure (e.g., to determine an optimal block size B).

As illustrated by FIG. 12, a cost function for the block-and-index rate structure may be developed by representing the utility provider as two electricity suppliers. In the system 1200, an electricity supplier B 1210 provides electricity $e_{b,i}$ corresponding to a fixed-price power block (e.g., blocks 904 and 906 of FIG. 9) at the block rate $r_b$ while an electricity supplier A 1212 provides electricity outside the block (i.e., $e_{ind,i}$) at the market rate $r_{DAP}$. In the example shown, an power connection 1203 is configured to obtain the power from the utility provider.

By representing the utility provider 1202 as a pair of electricity suppliers 1210-1212, a total cost function (in a case without sell-back) may be formulated as a sum of a term for each of the electricity suppliers 1210-1212. The cost associated with electricity supplier A 1210 over h time steps is $\Sigma_{i=k}^{k+h-1} r_{DAP,i} e_{ind,i}$. The cost associated with electricity supplier B 1212 over the same time period is $\Sigma_{i=k}^{k+h-1} r_b e_{b,i}$. Accordingly, the total cost for the utility provider 1202 may be expressed as $J=\Sigma_{i=k}^{k+h-1} r_{DAP,i} e_{ind,i} + \Sigma_{i=k}^{k+h-1} r_b e_{b,i}$.

In the case where the customer is not allowed to sell back power to the utility company, the customer will always purchase the full block $\Sigma_{i=k}^{k+h-1} r_b e_{b,i} = \Sigma_{i=k}^{k+h-1} r_b B$. Accordingly, for the sake of optimizing the cost associated with power consumption by the system 1200, the rate $r_b$ can be assumed to be zero because nothing can be done to affect the portion of the cost corresponding to electricity supplier B 1210. Thus, the cost function remaining to be optimized is $J=\Sigma_{i=k}^{k+h-1} r_{DAP,i} e_{ind,i}$. Furthermore, additional constraints are added based on the representation of the problem illustrated by FIG. 12. First, conservation of energy/power in the system 1200 yields $e_{ind,i}+e_{b,i}=e_{plant,i}+e_{campus,i}-e_{gen,i}$ wherein $e_{plant,i}$ is the amount of electricity consumed by the plant 1208 (e.g., allocation for chillers, etc. to meet other campus loads), $e_{campus,i}$ is the amount of electricity consumed by the campus 1206, and $e_{gen,i}$ is the amount of on-site electricity generation 1210. Second, the block-and-index rate structure requires the constraint $e_{b,i} \leq B$, where B is the predetermined block size.

This formulation of the cost function (i.e., $J=\Sigma_{i=k}^{k+h-1} r_{DAP,i} e_{ind,i}$; $e_{ind,i}+e_{b,i}=e_{plant,i}+e_{campus,i}-e_{gen,i}$, $e_{b,i} \leq B$) can then be fed into an optimization process to determine an optimal allocation of resources over an optimization period (e.g., from time step k to time step k+h−1). For example, the cost function may be used by the energy storage controller 506 and/or the planning tool 702. Various optimization processes are known, for example as described in U.S. patent application Ser. No. 15/473,496, filed Mar. 29, 2017, incorporated by reference herein in its entirety. Accordingly, an optimal allocation of resources under a block-and-index rate structure may be achieved by building a cost function by representing the utility provider as a first supplier that provides the predetermined block and a second supplier that provides power above the block, setting the rate for the second supplier to zero, and performing an optimization to minimize the resulting cost function.

Power Block with Sell Back

Still referring to FIG. 12, in some cases the customer is allowed to sell back to the market any unused power from the block (i.e., $B-e_{b,i}$) at the market rate $r_{DAP,i}$. In such a case, the term corresponding to electricity supplier B 1210 accounts for the sell-back, becoming $\Sigma_{i=k}^{k+h-1} r_{DAP,i}(B-e_{b,i})+r_b e_{b,i}$. The total cost function is then $J=\Sigma_{i=k}^{k+h-1} r_{DAP,i} e_{ind,i} - \Sigma_{i=k}^{k+h-1} r_{DAP,i}(B-e_{b,i})+r_b e_{b,i}$. In such a case, the cost function can be rearranged as $J=-\Sigma_{i=k}^{k+h-1} r_{DAP,i}B + \Sigma_{i=k}^{k+h-1} r_{DAP,i}(e_{IND,i}+e_{b,i})+r_b e_{b,i}$.

The cost function may then be further rewritten as $J=-\Sigma_{i=k}^{k+h-1} r_{DAP,i}B + \Sigma_{i=k}^{k+h-1} r_{DAP,i} e_{import,i}+r_b e_{b,i}$. Because the block size B is known the first term may be disregarded for optimization purposes. Furthermore, as above an assumption of $r_b=0$ may be made for optimization purposes, bringing the third term to zero. The resulting cost function is: $J=\Sigma_{i=k}^{k+h-1} r_{DAP,i} e_{import,i}$. The cost function for a power block with sell-back rate structure thereby reduces to the cost function found for an hourly varying electricity rate structure.

Accordingly, in such a case, optimization may proceed as for an hourly varying electricity rate structure, for example as described in U.S. patent application Ser. No. 15/473,496, filed Mar. 29, 2017, incorporated by reference herein in its entirety. For example, the cost function may be used by the energy storage controller 506 and/or the planning tool 702.

Energy Block

Figure 13:
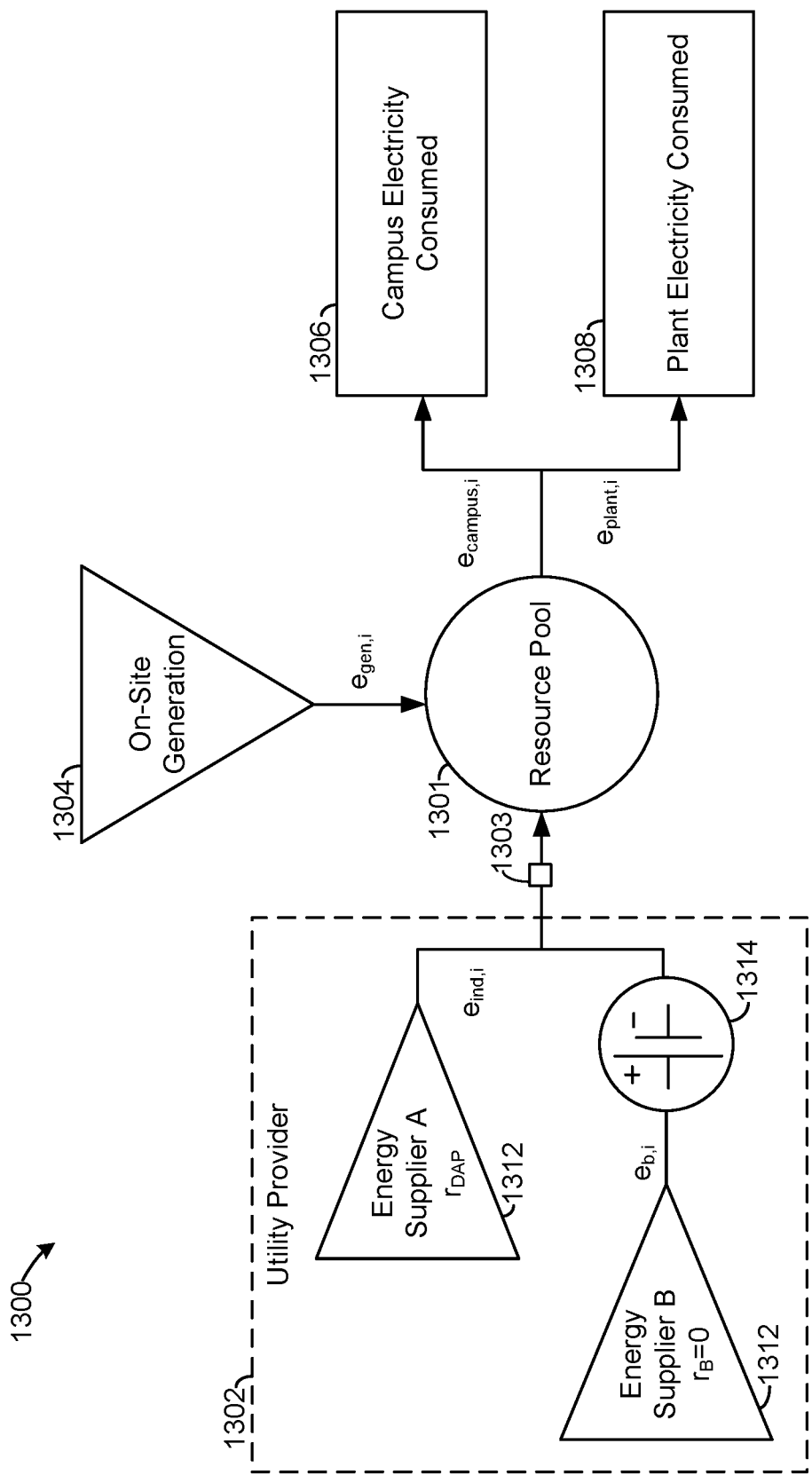
FIG. 13 is a block diagram of a building energy system under an energy block-and-index rate structure, according to an exemplary embodiment.

Referring now to FIG. 13, a block diagram of a resource allocation system 1300 subject to a block-and-index rate structure is shown, according to an exemplary embodiment. In the resource allocation system 1300, energy (e.g., in the form of a resource such as natural gas) is provided to a resource pool 1301 by a utility provider 1302. Resources are consumed at a campus 1306. Resources are also consumed at a plant 1308, for example to generate electricity or other resources fed back into the resource pool 1301 via on-site generation 1304 (e.g., natural gas may be used to generate electricity, steam, etc.). The utility provider 1302 provides energy under a block-and-index rate structure, as described with reference to FIGS. 9-10.

The resource allocation system 1300 may therefore correspond to the energy storage system 500 in FIG. 5. In some embodiments, the energy storage controller 506 of FIGS. 5-6 is used with the resource allocation system 1300 to allocate resources and load amongst the utility provider 1302, on-site generation 1304, campus 1306, and plant 1308. In some embodiments, the planning tool 702 is used with the resource allocation system 1300 to predict energy/power costs and/or determine an optimal participation strategy in a block-and-index rate structure (e.g., to determine an optimal block size B for a calendar period).

As illustrated by FIG. 13, a cost function for the block-and-index rate structure may be developed by representing the utility provider as two energy suppliers. In the system 1300, an energy supplier B 1310 provides energy corresponding to a fixed-price energy block (e.g., a set amount of an energy resource) at the block rate $r_b$ while an electricity supplier A 1312 provides energy outside the block (i.e., $e_{ind,i}$) at the market rate $r_{DAP}$. In the example shown, an energy connection 1303 is configured to obtain the energy from the utility provider.

By representing the utility provider 1302 as a pair of energy suppliers 1310-1312, a total cost function may be formulated as a sum of a term for each of the energy suppliers 1310-1312. The cost associated with energy supplier A 1310 over h time steps is $\sum_{i=k}^{k+h-1} r_{DAP,i} e_{ind,i}$, where h is the length of an optimization period. The cost associated with energy supplier B 1312 over the same time period is $\sum_{i=k}^{k+h-1} r_b e_{b,i}$. Accordingly, the total cost for the utility provider 1202 may be expressed as $J=\sum_{i=k}^{k+h-1} r_{DAP,i} e_{ind,i} + \sum_{i=k}^{k+h-1} r_b e_{b,i}$.

Because the block of the resource is always purchased under this rate structure, for optimization purposes the block rate $r_b$ can be assumed to be zero. Accordingly, the cost function for use in optimization becomes $J=\sum_{i=k}^{k+h-1} r_{DAP,i} e_{ind,i}$. The cost function is subject to a first constraint $\sum_{i=k}^{k+h-1} e_{b,i} \leq B$, which ensures that the sum of the energy provided by energy supplier B 1310 at each time step cannot exceed the total block amount B purchased for the whole time period. The cost function is also subject to a second constraint $e_{b,i} \geq 0$ which ensures that energy cannot be sold back to the utility provider 1302.

As illustrated in FIG. 13, the optimization problem is substantially similar to a system having energy storage equipment 1314 with a capacity equivalent to the energy block purchase (i.e., a capacity of B). The energy storage equipment 1314 is recharged to full capacity at the beginning of a time period, using energy from energy supplier B 1310 at the block price $r_b$. In the optimization problem, a demand charge for energy supplier B 1310 may be set to zero at the beginning of the period to allow the battery to charge, and then set very high for the remainder of the time period to prevent charging later in the time period. The energy storage equipment 1314 may discharge at a different rate at different time steps i.

This optimization problem (i.e., the cost function $J=\sum_{i=k}^{k+h-1} r_{DAP,i} e_{ind,i}$, constraints $\sum_{i=k}^{k+h-1} e_{b,i} \leq B$ and $e_{b,i} \geq 0$, etc.) may be used by the energy storage controller 506 for optimization and online control and/or by the planning tool 702, for example for determining an optimal participation strategy in the block-and-index pricing scheme. Various optimization approaches are possible, for example as described in U.S. patent application Ser. No. 15/473,496, filed Mar. 29, 2017, incorporated by reference in its entirety herein.

Block Size Optimization for Block and Index Rate Structure

Referring to FIGS. 12-13, the optimization problem described with reference thereto can also be formulated to determine the optimal block size in a planning tool framework (e.g., with planning tool 702). The optimization problem to be solved to determine the optimal block size B has the form $J=\sum_{i=k}^{k+h-1} r_{LMP,i} e_{ind,i} + \sum_{i=k}^{k+h-1} r_b e_{b,i} + r_b w_b B$, where $w_b$ is a weighting term. The constraints defined above with reference to FIGS. 12 and 13 still apply in corresponding embodiments, while $r_b$ can be assumed to be zero as above. This optimization problem can be solved using a similar approach as for a demand charge auxiliary variable, for example as described in U.S. patent application Ser. No. 15/405,236, filed Jan. 12, 2017, incorporated by reference in its entirety herein, or as for an asset sizing problem, for example as described in U.S. patent application Ser. No. 15/426,962, filed Feb. 7, 2017, incorporated by reference in its entirety herein. That is, in some embodiments, a cost function is optimized to determine the optimal size of the block as the size of the block that minimizes the total cost of purchasing a resource from a utility provider over an upcoming time period. This optimization may follow a stochastic approach to optimize the cost function over several scenarios of possible loads and rates. Systems and methods relating to such stochastic scenarios are described in detail in U.S. patent application Ser. No. 16/115,290, filed Aug. 28, 2018, incorporated by reference herein in its entirety.

Cost Optimization for Load-Following-Block Rate Structure

Figure 14:
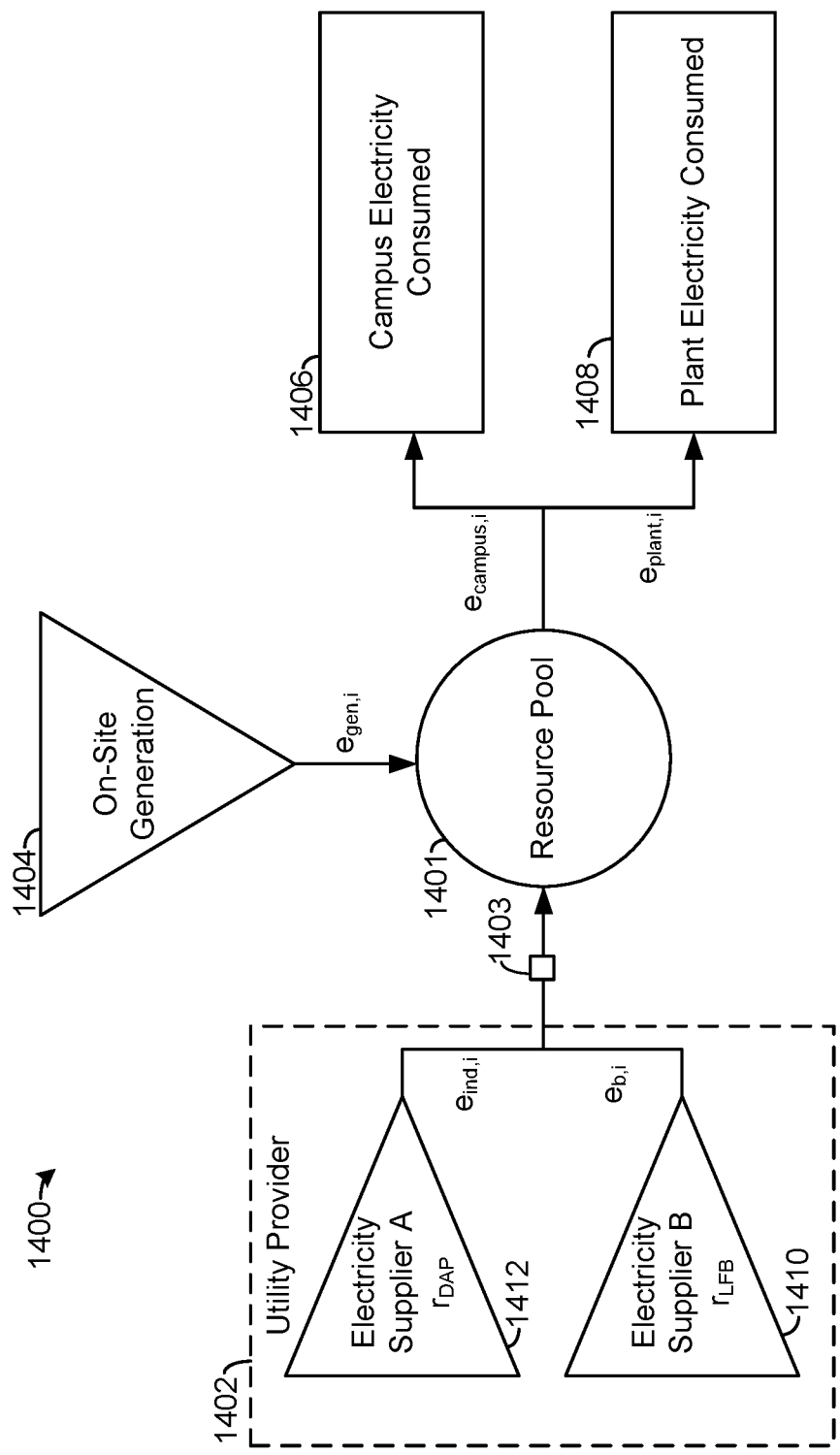
FIG. 14 is a block diagram of a building energy system under a load-following-block rate structure, according to an exemplary embodiment.

Referring now to FIG. 14, a block diagram of a resource allocation system 1400 subject to a load-following-block rate structure is shown, according to an exemplary embodiment. In the resource allocation system 1400, electricity is provided to a resource pool 1401 by a utility provider 1402 and generated on site via on-site generation 1404. Resources are consumed at a campus 1406. Resources are also consumed at a plant 1408, for example to generate electricity fed back into the resource pool 1401 via on-site generation 1404. The utility provider 1402 provides power under a load-following-block rate structure, for example as described with reference to FIG. 11.

The resource allocation system 1400 may therefore correspond to the energy storage system 500 in FIG. 5. In some embodiments, the energy storage controller 506 of FIGS. 5-6 is used with the resource allocation system 1400 to allocate resources and load amongst the utility provider 1402, on-site generation 1404, campus 1406, and plant 1408. In some embodiments, the planning tool 702 is used with the resource allocation system 1400 to predict energy/power costs and/or determine an optimal participation strategy in a load-following-block rate structure (e.g., to determine an hedge percentage $\alpha_h$).

As illustrated by FIG. 14, a cost function for the load-following-block rate structure may be developed by representing the utility provider 1402 as two electricity suppliers. In the system 1400, an electricity supplier B 1410 provides electricity corresponding to a fixed-price load-following block (e.g., blocks 1102 of FIG. 11) at the block rate $r_{LFB}$ while an electricity supplier A 1412 provides electricity outside the block at the market rate $r_{DAP}$. That is, electricity supplier B 1410 supplies electricity $\alpha_h e_{import,i}$ while electricity supplier A 1412 supplies electricity $(1-\alpha_h)e_{import,i}$. In the example shown, an energy connection 1403 is configured to obtain the energy from the utility supplier.

By representing the utility provider 1402 as a pair of electricity suppliers 1410-1412, a total cost function may be formulated as a sum of a term for each of the electricity suppliers 1410-1412. The cost associated with electricity supplier A 1412 over h time steps is $\Sigma_{i=k}^{k+h-1}(1-\alpha_h)r_{DAP,i}e_{import,i}$. The cost associated with electricity supplier B 1410 over the same time period is $\Sigma_{i=k}^{k+h-1}\alpha_h r_{LFB}e_{import,i}$. Together, the total cost function is $J=\Sigma_{i=k}^{k+h-1}\alpha_h r_{LFB}e_{import,i}+\Sigma_{i=k}^{k+h-1}(1-\alpha_h)r_{DAP,i}e_{import,i}$. This can be reduced to $J=\Sigma_{i=k}^{k+h-1}(\alpha_h r_{LFB,i}+(1-\alpha_h)r_{DAP,i})e_{import,i}$. Accordingly, with a known hedging percentage $\alpha_h$ the load-following-block rate structure translates to a mere rate adjustment of an hourly rate structure. The optimization problem may thus be solved by the energy storage controller 506 or planning tool 702 using one or more processes suitable for optimization under an hourly rate structure, for example as described in U.S. patent application Ser. No. 15/473,496, filed Mar. 29, 2017, incorporated by reference herein in its entirety. Processes for determining an optimal hedging percentage $\alpha_h$ are shown in FIGS. 15-16 and described in detail with reference thereto.

Load-Following-Block Hedge Percentage Optimization

Figure 15:
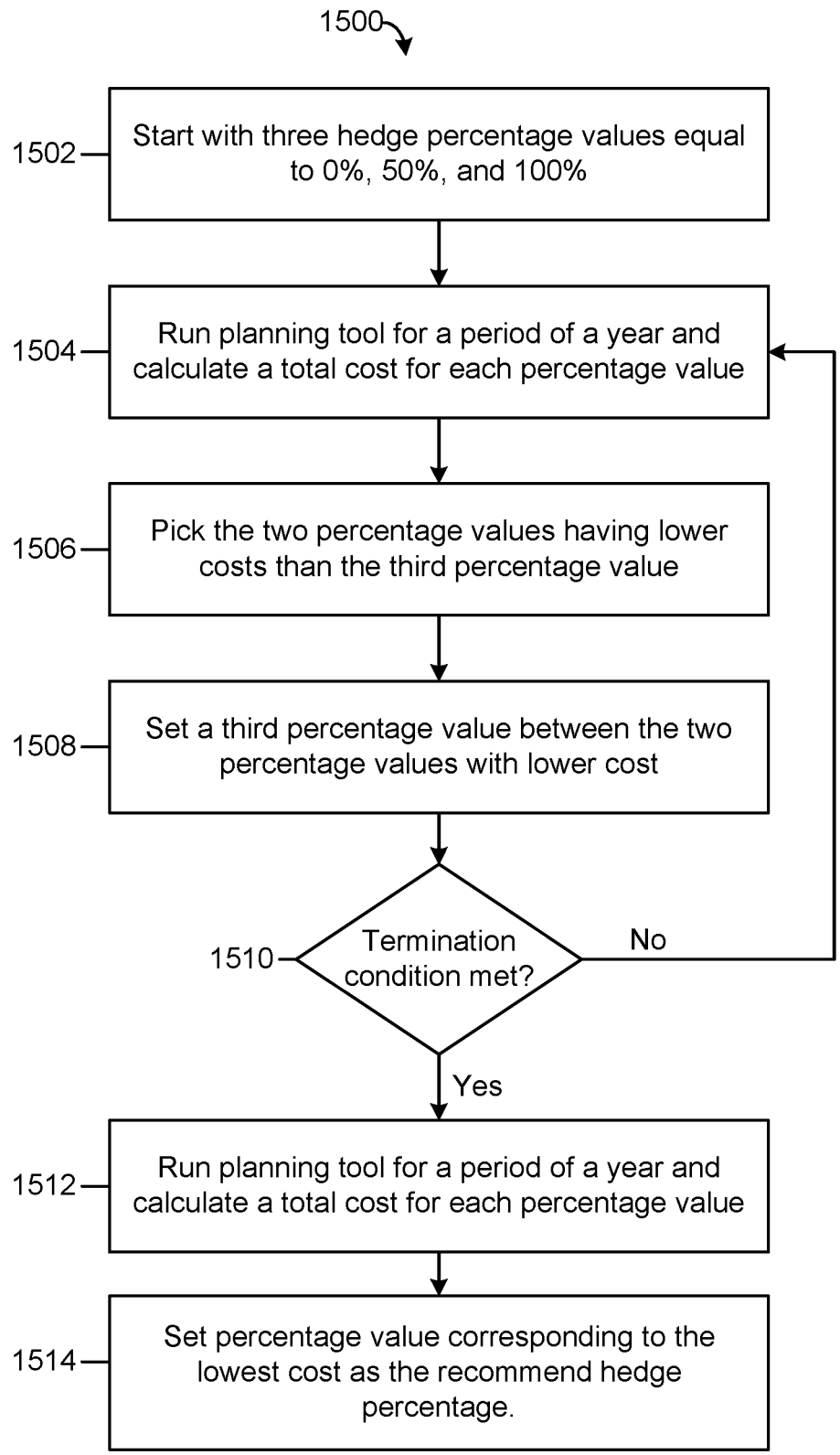
FIG. 15 is a flowchart of a first process for determining an optimal hedging percentage for a load-following-block rate structure.
Figure 16:
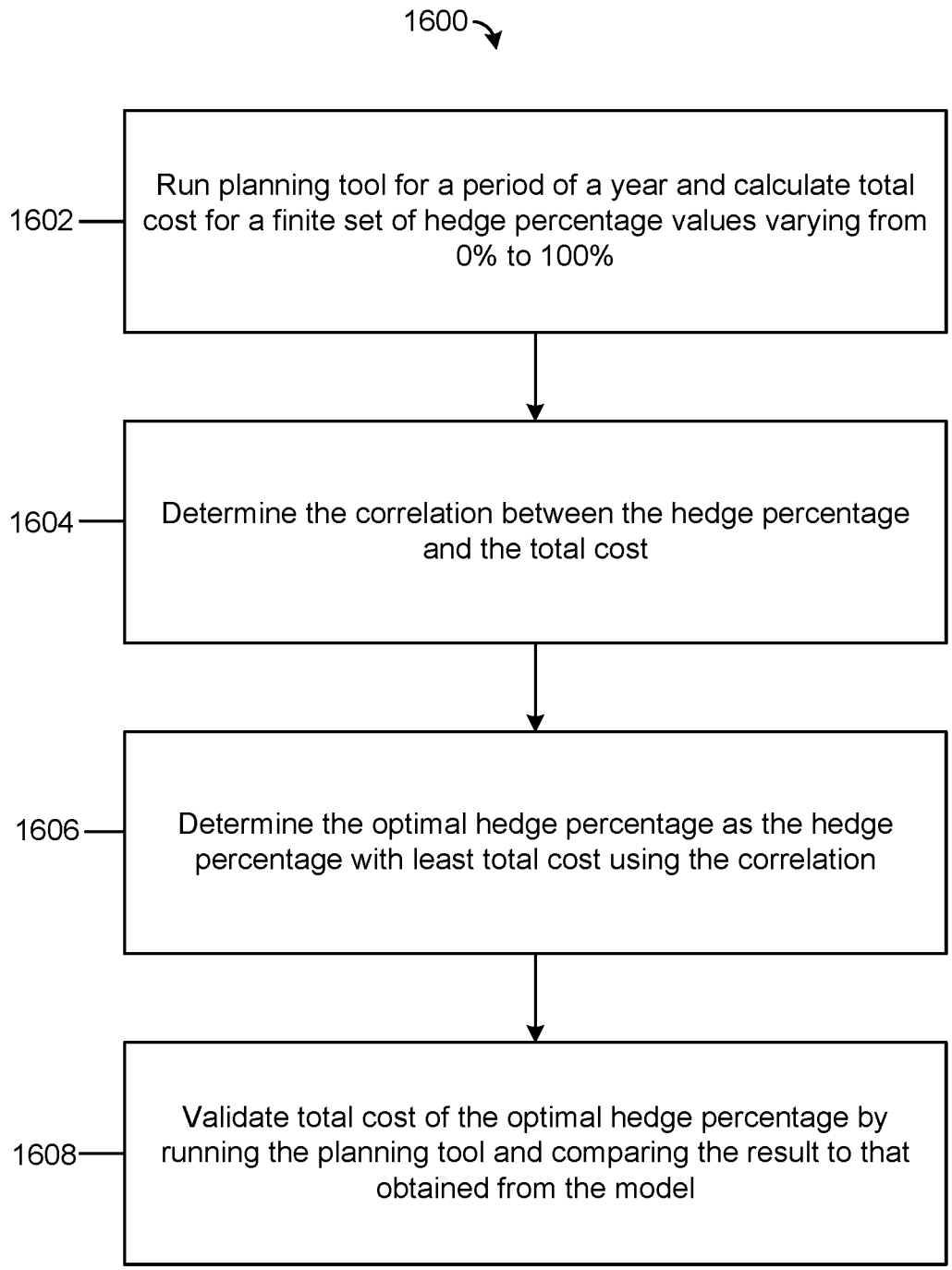
FIG. 16 is a flowchart of a second process for determining an optimal hedging percentage for a load-following-block rate structure.

Referring now to FIGS. 15-16, processes for determining a hedging percentage $\alpha_h$ are shown, according to exemplary embodiments. FIG. 15 shows a flowchart of a process 1500 that takes an iterative narrowing approach to locate an optimal hedging percentage. FIG. 16 shows a flowchart of an alternative process 1600 that uses a modeling approach to determine the optimal hedging percentage. The planning tool 702 may be configured to execute process 1500 and/or process 1600.

Referring now to FIG. 15, the process 1500 starts at step 1502 where three hedge percentage values are picked as 0%, 50%, and 100%. The starting hedge percentage values thereby span the full range of possible hedge percentages and bisect that range.

At step 1504, the planning tool 702 runs a simulation for a time period (e.g., a year) for each of the three hedge percentage values. A total cost (e.g., a cost associated with the power/energy purchased under the load-following-block hedge rate structure) for the period is found for each of the three hedge percentage values. At step 1506, the two lowest of the three total costs are determined, and the corresponding hedge percentage values are selected. That is, the planning tool 702 selects the two hedge percentage values corresponding to the lowest two total costs and eliminates the hedge percentage value corresponding to the highest total cost. This approach assumes that the two hedge percentage values corresponding to the lowest two costs are adjacent (i.e., 50% and 100%, 0% and 50%, but not 0% and 100%).

At step 1508, a third hedge percentage value is set between the two hedge percentage values selected at step 1506. For example, if 50% and 100% are selected at step 1506 (i.e., if 50% and 100% correspond to the two lowest total costs in the simulation of step 1504), a third hedge percentage value is selected between 50% and 100%. In some embodiments, the third hedge percentage value may bisect the selected range (i.e., 75% in the preceding example).

At step 1510, the planning tool 702 checks whether a termination condition has been met. The termination condition may be based on a difference between two of the three selected values, for example such the termination condition is met if all three values are within a threshold range (e.g., 5%, 1%). In preferred embodiments, the termination condition is not met on the first iteration.

If the termination condition is not met, the process 1500 returns to step 1504, where a simulation is run for a time period for each of the three selected hedge percentage values (i.e., the two values selected at step 1506 and the third value selected at step 1508). A total cost is determined for each of the three values. At step 1506, the two values corresponding to lower total costs are again selected. At step 1508, a third percentage between those two values is set. The intervals between the three values thereby decreases with each iteration through steps 1504-1510.

After a number of iterations (e.g., 3, 5, 10), the termination condition may be met at step 1510. Once the termination condition is met, the process 1500 proceeds to step 1512. At step 1512, the planning tool 702 runs a simulation over the time period and determines a total cost for each of three percentage values. At step 1514, the percentage value corresponding to the lowest cost calculated at step 1512 is selected as the recommended hedge percentage. The recommended hedge percentage may be provided to a user via a graphical user interface.

Referring now to FIG. 16, an alternative process 1600 for determining a recommended hedge percentage is shown, according to an exemplary embodiment. At step 1602, the planning tool 702 runs a simulation for a time period (e.g., one year) for each of a finite set of hedge percentage values of various values between 0% and 100% (e.g., ten values, twenty values, fifty values). A total cost for the time period is determined for each value in the finite set to generate a dataset of hedge percentage values and corresponding total costs.

At step 1604, the correlation between hedge percentage value and total cost is determined. That is, a model is fit to the dataset generated at step 1604 that describes total cost as a function of hedge percentage value. The model may then be used to find the optimal hedge percentage without the need to rerun simulations over the time period (e.g., without the need to run multiple one-year simulations), and without the need for the process 1500 of FIG. 15.

At step 1606, an optimal hedge percentage is found using the correlation found in step 1604. For example, a minimum of a function (model) that describes total cost as a function of hedge percentage value may be found to identify a hedge percentage value between 0% and 100% that minimizes cost. In some cases, a golden section search, gradient decent, Finonacci search, or Newton's method may be used to find the minimum of the model. The hedge percentage value that minimizes the total cost using the model is selected at the optimal/recommended hedge percentage.

At step 1608, the selected optimal/recommended hedge percentage is validated by selecting another set of hedge percentage values (i.e., different values, in some embodiments including the optimal/recommended hedge percentage) and running the simulation over the same time period as in step 1602. Total costs generated from this new simulation may be compared to the model determined at step 1604 and the selected optimal/recommended hedge percentage. If the data generated at step 1608 validates that the optimal/recommended hedge percentage approximately corresponds to a minimum total cost, process 1600 ends and that hedge percentage is output as the recommended hedge percentage. If validation fails, the process 1600 may return to step 1604 where the new dataset may be refit with a new model. Steps 1604 through 1608 may repeated until a recommended hedge percentage is validated. The recommended hedge percentage may be provided to a user via a graphical user interface and/or automatically implemented by communicating the hedge percentage to a utility provider and controlling the equipment in accordance with optimization at the recommended hedge percentage as described above.

In some embodiments, process 1500 and/or process 1600 may include a stochastic approach. In such an embodiment, possible loads and possible index rates are generated for each of several scenarios for the time period. The recommended hedge percentage may be chosen such that the cost function is minimized over all of the scenarios. Systems and methods for generating such scenarios are described in detail in U.S. patent application Ser. No. 16/115,290, filed Aug. 28, 2018, incorporated by reference herein in its entirety.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for equipment that operate to store, discharge, generate, or consume one or more resources, the controller comprising:
   one or more processors and memory storing instructions that, when executed by the one or more processors, cause the one or more processors to perform operations comprising:
      providing an objective function indicating a total value of obtaining a first resource of the one or more resources from a utility provider over a plurality of time steps subject to a load-following-block rate structure, the objective function comprising a first term representing a load-following-block of the first resource as being sourced from the utility provider at a fixed rate and further comprising a second term representing a remainder of the first resource as being sourced from the utility provider at a variable rate;
      using the objective function to generate values for one or more decision variables that indicate amounts of the one or more resources to obtain, store, discharge, generate, or consume at the plurality of time steps; and
      controlling the equipment to store, discharge, generate, or consume the amounts of the one or more resources indicated by the values of the one or more decision variables at the plurality of time steps.

2. The controller of claim 1, wherein the load-following-block is sized as a proportion of a total amount of the first resource obtained from the utility provider.

3. The controller of claim 2, wherein the objective function comprises a value of obtaining the first resource from the utility provider at a given time step of the plurality of time steps as an adjusted rate multiplied by an amount of the first resource obtained from the utility provider at the given time step.

4. The controller of claim 3, wherein the adjusted rate is defined based on the proportion, the fixed rate, and the variable rate for the given time step.

5. The controller of claim 2, wherein the controller is configured to determine the proportion by minimizing the total value of obtaining the first resource from the utility provider over a given time period.

6. The controller of claim 2, wherein the controller is configured to receive the proportion as an input from a user.

7. A method for operating equipment to store, discharge, generate, or consume one or more resources, the method comprising:
   providing an objective function indicating a total value of obtaining a first resource of the one or more resources from a utility provider over a plurality of time steps subject to a load-following-block rate structure, the objective function comprising a first term representing a load-following-block of the first resource as being sourced from the utility provider at a fixed rate and further comprising a second term representing a remainder of the first resource as being sourced from the utility provider at a variable rate;

using the objective function to generate values for one or more decision variables that indicate amounts of the one or more resources to obtain, store, discharge, generate, or consume at the plurality of time steps; and controlling the equipment to store, discharge, generate, or consume the amounts of the one or more resources indicated by the values of the one or more decision variables at the plurality of time steps.

8. The method of claim 7, wherein the load-following-block is sized as a proportion of a total amount of the first resource obtained from the utility provider.

9. The method of claim 8, wherein the objective function comprises a value of obtaining the first resource from the utility provider at a given time step of the plurality of time steps as an adjusted rate multiplied by an amount of the first resource obtained from the utility provider at the given time step.

10. The method of claim 9, wherein the adjusted rate is defined based on the proportion, the fixed rate, and the variable rate for the given time step.

11. The method of claim 8, comprising determining the proportion by minimizing the total value of obtaining the first resource from the utility provider over a given time period.

12. The method of claim 8, comprising receiving the proportion as an input from a user.

13. A method for operating equipment to store, discharge, generate, or consume one or more resources, the method comprising:
   providing an objective function comprising a proportion for a load-following-block rate structure as a decision variable, the objective function comprising a value of obtaining a first resource of the one or more resources from a utility provider over a time period, wherein the proportion indicates a portion of a total amount of the first resource obtained from the utility provider at a fixed rate and a remainder of the total amount is obtained from the utility provider at a variable rate;
   determining, based on the objective function, a recommended value of the proportion for the load-following-block rate structure that minimizes a predicted value of operating the equipment over the time period;
   generating control decisions for the equipment based on the recommended value of the proportion for the load-following-block rate structure; and
   controlling the equipment in accordance with the control decisions to store, discharge, generate, or consume the one or more resources.

14. The method of claim 13, comprising determining the predicted value of operating the equipment over the time period for each of a plurality of potential values of the proportion by performing a simulation over the time period for each of the plurality of potential values of the proportion.

15. The method of claim 14, wherein determining the recommended value of the proportion comprises:
   evaluating the objective function for each of the plurality of potential values of the proportion to determine a plurality of predicted values of operating the equipment predicted to result from the plurality of potential values of the proportion;
   fitting a model to the plurality of potential values of the proportion and the plurality of predicted values of operating the equipment;
   determining a value of the proportion that minimizes the predicted value of operating the equipment by minimizing the model with respect to the proportion; and
   selecting the recommended value of the proportion based on the value of the proportion that minimizes the predicted value of operating the equipment.

16. The method of claim 15, wherein minimizing the model with respect to the proportion comprises performing at least one of gradient descent, a golden section search, a Fibonacci search, or Newton's method.

17. The method of claim 13, comprising generating a plurality of alternative scenarios of possible loads and possible index rates that could occur over the time period;
   wherein the recommended value of the proportion minimizes the predicted value of operating the equipment over the time period over all of the plurality of scenarios.

18. The method of claim 17, wherein generating the plurality of possible loads and possible index rates that could occur over the time period comprises:
   storing a history of past scenarios comprising actual values for historical loads and historical index rates; and
   at least one of (i) sampling the possible loads and possible index rates from the history of past scenarios or (ii) generating an estimated distribution based on the history of past scenarios and sampling the possible loads and possible index rates from the estimated distribution.

19. The method of claim 17, wherein generating the plurality of possible loads and possible index rates that could occur over the time period comprises:
   receiving user input defining user-defined loads and user-defined index rates for several scenarios; and
   at least one of (i) sampling the possible loads and possible index rates from the user-defined loads and user-defined rates or (ii) generating an estimated distribution based on the user-defined loads and user-defined index rate and sampling the possible loads and possible index rates from the estimated distribution.

20. The method of claim 13, comprising providing the recommended value of the proportion to a user via a graphical user interface.

* * * * *